United States Patent
Dernotte et al.

(10) Patent No.: US 12,442,864 B2
(45) Date of Patent: Oct. 14, 2025

(54) FORCE BASED ABNORMALITY DETECTION IN BATTERY PACK MODULES

(71) Applicant: GM GLOBAL TECHNOLOGY OPERATIONS LLC, Detroit, MI (US)

(72) Inventors: Jeremie Dernotte, Rochester, MI (US); Arun S. Solomon, Rochester Hills, MI (US); Scott E. Parrish, Farmington Hills, MI (US); Wei Zeng, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 401 days.

(21) Appl. No.: 17/879,842

(22) Filed: Aug. 3, 2022

(65) Prior Publication Data

US 2024/0044992 A1 Feb. 8, 2024

(51) Int. Cl.
*G01R 31/392* (2019.01)
*G01R 31/36* (2020.01)
*G01R 31/387* (2019.01)
*H01M 10/48* (2006.01)

(52) U.S. Cl.
CPC ....... *G01R 31/392* (2019.01); *G01R 31/3646* (2019.01); *G01R 31/387* (2019.01); *H01M 10/482* (2013.01); *H01M 10/486* (2013.01)

(58) Field of Classification Search
CPC ..... H01M 50/24; B60L 3/0007; G01R 31/387
See application file for complete search history.

(56) References Cited

U.S. PATENT DOCUMENTS

| | | | |
|---|---|---|---|
| 2010/0136404 A1* | 6/2010 | Hermann | H01M 50/24 429/120 |
| 2015/0210182 A1* | 7/2015 | Phlegm | B60L 3/0007 429/61 |
| 2021/0234209 A1* | 7/2021 | Wang | H01M 10/425 |

* cited by examiner

*Primary Examiner* — Lam S Nguyen

(57) ABSTRACT

A system includes a battery pack module and a control module. The battery pack module is configured to be implemented in a battery pack. The battery pack module includes cells and one or more force sensors configured to generate at least one force signal indicative of force on the cells within the battery pack module. The control module is configured to: receive the at least one force signal; based on the at least one force signal, detect a state of the cells; and based on the detected state of the cells, at least one of i) modify the state of the cells, ii) generate an alert message, and iii) perform a mitigation operation to address a detected abnormality of the cells.

18 Claims, 15 Drawing Sheets

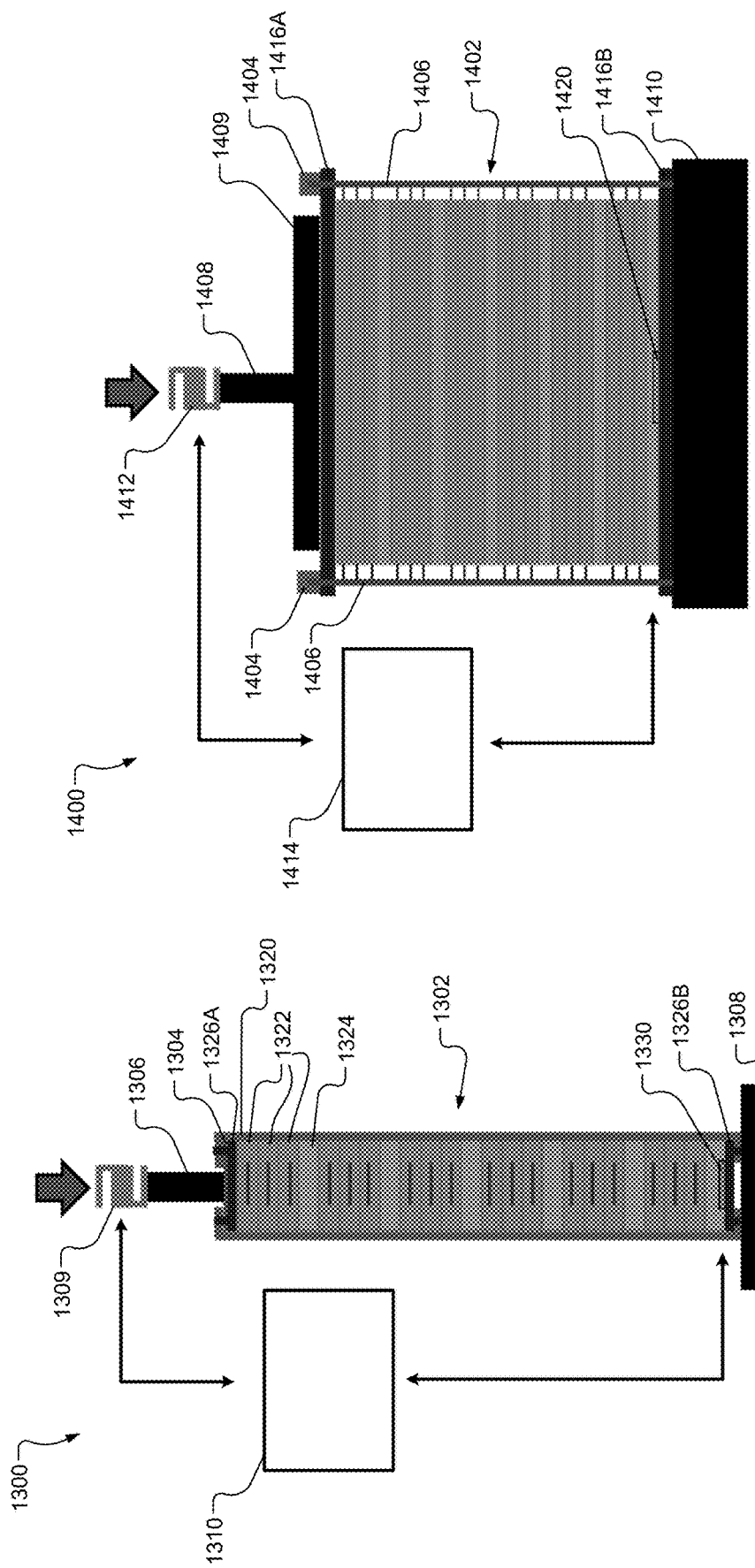

FORCE BASED ABNORMALITY DETECTION IN BATTERY PACK MODULES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery module monitoring and/or management systems for battery modules.

Advanced energy storage devices and systems are in demand to satisfy energy and/or power requirements for a variety of products, including automotive and non-automotive products such as start-stop systems (e.g., 12V start-stop systems), battery-assisted systems, hybrid electric vehicles ("HEVs"), electric vehicles ("EVs"), network devices, portable electronic devices, electric bikes, power storage devices, etc. These products include batteries, such as lithium-ion batteries and/or other batteries.

SUMMARY

A system is disclosed that includes a battery pack module and a control module. The battery pack module is configured to be implemented in a battery pack. The battery pack module includes cells and one or more force sensors configured to generate at least one force signal indicative of force on the cells within the battery pack module. The control module is configured to: receive the at least one force signal; based on the at least one force signal, detect a state of the cells; and based on the detected state of the cells, at least one of i) modify the state of the cells, ii) generate an alert message, and iii) perform a mitigation operation to address a detected abnormality of the cells.

In other features, the control module is configured based on the at least one force signal to verify compression force on the battery pack module during assembly, and based on results of verifying the compression force, to readjust compression of the battery pack module.

In other features, the control module is configured to based on the at least one force signal, detect the abnormality in the cells, and perform a mitigation operation to address the abnormality.

In other features, the system further includes at least one other sensor configured to generate at least one sensor signal. The control module is configured to: based on precalibration, the at least one force signal and the at least one sensor signal, determine at least one of an average state-of-health of the battery pack module, an average state-of-charge of the battery pack module and an average cell temperature of the battery pack module; and based on the determined the at least one of the average state-of-health of the battery pack module, the average state-of-charge of the battery pack module and the average cell temperature of the battery pack module, at least one of modify the state of the cells, generate the alert message, and perform the mitigation operation to address the detected abnormality of the cells.

In other features, the at least one other sensor includes at least one of a voltage sensor, a current sensor, a temperature sensor, and gas sensor.

In other features, the battery pack module includes only a single force sensor.

In other features, the battery pack module includes force sensors generating force signals including the at least one force signal.

In other features, the control module is configured to, based on the at least one force signal, predict a thermal runaway event.

In other features, the control module is configured to perform the mitigation operation to at least one of prevent, slow down and stop the thermal runaway event.

In other features, the control module is configured to at least one predict and detect a thermal runaway event based on a change in magnitude of the at least one force signal.

In other features, the control module is configured to at least one of predict and detect a thermal runaway event based on a rate of change in magnitude of the at least one force signal.

In other features, the system further includes at least one sensor configured to generate at least one sensor signal. The control module is configured to, based on the at least one sensor signal, detect or verify that the abnormality exists in the cells.

In other features, the battery pack module includes at least one other sensor which operates in concert with the at least one force sensor. The control module is configured to confirm the abnormality based on at least one output of the at least one other sensor and the at least one force signal.

In other features, the at least one other sensor includes at least one of a voltage sensor, a current sensor, a gas sensor and a temperature sensor.

In other features, the control module is configured to: determine one or more parameters of the battery pack module selected from a state-of-charge, a state-of-health, a voltage, a current level, a pressure, a gas level, and a temperature; and based on the at least one force signal and the one or more parameters, detect the abnormality in the cells.

In other features, the system further includes the battery pack. The battery pack includes battery pack modules. The battery pack modules include the battery pack module in which the abnormality is detected; and each of the battery pack modules includes a respective set of cells.

In other features, each one of the battery pack modules includes a respective one or more force sensors configured to generate at least one force signal indicative of force on the cells within the one of the battery pack modules. The control module is configured to detect thermal runaway propagation from battery pack module-to-battery pack module based on the force signals received from the battery pack modules.

In other features, the control module is configured to detect damage to the battery pack module based on the at least one force signal, and at least one of generate the alert message and perform the mitigation operation based on the detected damage.

In other features, the control module is configured to, based on the detected abnormality, perform a mitigation process to prevent a thermal runaway event including at least one of i) activating targeted cooling of the battery pack module, ii) discharging the battery pack module, iii) isolating the battery pack module, and iv) generating an alert message indicating prediction of a thermal runaway event.

In other features, the control module is configured to, based on the detected abnormality, perform a mitigation process to slow down or stop a thermal runaway event including at least one of i) sending a signal to a fire station, ii) generating an alert message indicating occurrence of a thermal runaway event, iii) performing targeted cooling, and iv) flooding the battery pack module.

In other features, the control module is configured: based on the at least one force signal, to verify compression force on the battery pack module; and based on results of verifying the compression force, to readjust compression of the battery pack module In other features, a system is disclosed and includes a control module and a battery pack module, which is configured to be implemented in a battery pack. The battery pack module includes: cells; and one or more force sensors configured to generate at least one force signal indicative of force on the cells within the battery pack module. The control module is configured to: receive the at least one force signal; determine a rate of change in magnitude of the at least one force signal; at least one of predict and detect a thermal runaway event based on a rate of change in magnitude of the at least one force signal; and in response to detecting the thermal runaway event, schedule service for a host vehicle of the battery pack.

In other features, a method of detecting an abnormality in a battery pack module of a battery pack is disclosed. The method includes: generating at least one force signal via one or more force sensors, the at least one force signal indicative of force on cells within the battery pack module; receiving the at least one force signal; based on the at least one force signal, detecting a state of the cells; and based on the detected state of the cells, at least one of i) modifying the state of the cells, ii) generating a message, and iii) performing a mitigation operation to address a detected abnormality of the cells.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 13 is a side view of an example compression system including a battery pack module being compressed by a load press using shims in accordance with the present disclosure;

FIG. 14 is a side view of an example compression system including a battery pack module being compressed by a load press for setting fasteners on compression rods in accordance with the present disclosure.

In the drawings, reference numbers may be reused to identify similar and/or identical elements.

DETAILED DESCRIPTION

Figure 1:
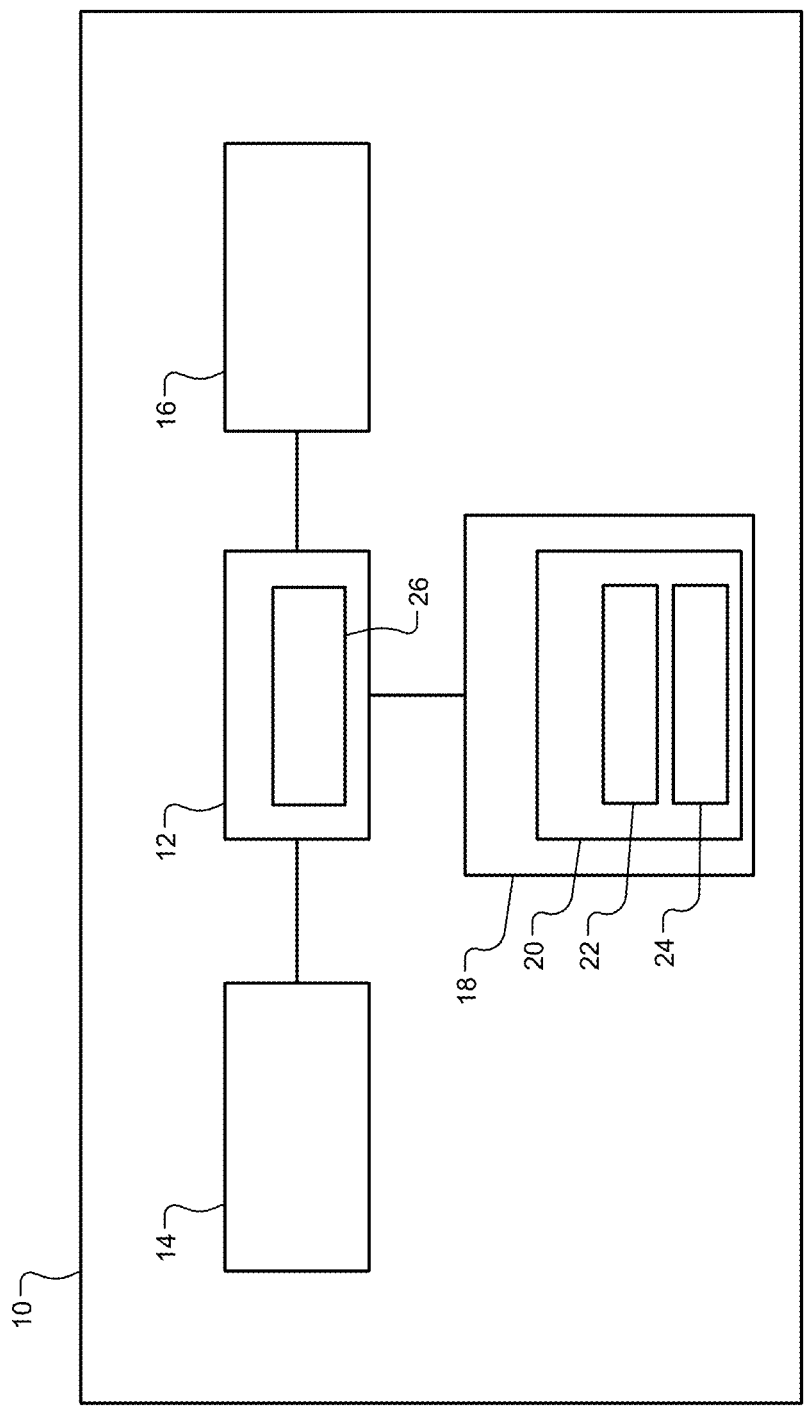
FIG. 1 is a functional block diagram of an example apparatus including force sensors in accordance with the present disclosure.

All electric and hybrid vehicles can include large battery packs, which include battery pack modules including battery cells. The cells of each of the battery pack modules may be connected in series and/or parallel. The battery pack modules may also be connected in series or in parallel to provide various output voltages, such as 12V and 48V to power 12V loads and 48V loads. The battery pack modules may also be connected in series or in parallel for higher voltages such as 400V, 800V and voltages above 800V.

During operation, parameters such as voltage, current, and temperature of battery pack modules and cells may be monitored to determine SOX values of the battery pack modules and cells. The acronym "SOX" refers to a state of charge (SOC), a state of health (SOH), state of power (SOP), and/or a state of function (SOF). The SOC of a cell and/or battery pack module may refer to the voltage, current and/or amount of available power stored in the cell and/or battery pack module. The SOH of a cell and/or battery pack module may refer to: the age (or operating hours); whether there is a short circuit; whether there is a loose wire or bad connection; temperatures, voltages, power levels, and/or current levels supplied to or sourced from the cell and/or battery pack module during certain operating conditions; and/or other parameters describing the health of the cell and/or battery pack module. The SOF of a cell and/or battery pack module may refer to a current temperature, voltage, and/or current level supplied to or sourced from the cell and/or battery pack module, and/or other parameters describing a current functional state of the cell and/or battery pack module. As an example, the SOC and SOH of a cell and/or a battery pack module may be monitored to detect a thermal runaway event (TRE).

The measuring of voltages, current levels and/or temperatures of cells can require a large number of sensors and the information that is able to be obtained from measuring these parameters can be limited. Voltage based monitoring methods that monitor voltages of battery pack modules including cells connected in parallel exhibit low signal to noise ratios (SNRs). Also, when cells are connected in parallel, it can be difficult to determine when a single cell has an abnormality based solely on voltage of the cells. Temperature based monitoring methods can be slow to react to an abnormality due to a delay in temperature change. Temperature is slow to change and can result in a long delay from when a fault occurs until when the fault is detected. Voltage and temperature based monitoring methods have a medium information level, whereas gas monitoring systems have a low information level. The information levels refer to the amount of information that can be determined based solely on the detected parameter. Gas and pressure monitoring at the battery pack level suffers from low SNR and false alerts.

The cells of a battery pack module may be implemented, for example, as pouch cells or prismatic cells. The cells may be stacked and compressed during assembly to form the battery pack module. The forces on the cells due to compression, the chemical and material makeup of the cells, and the states of the cells can change during assembly, post assembly, and during operation of the cells. Over a lifetime and use of the cells, pressures within the cells can increase, which can increase forces on the cells due to the inclusion of multiple cells within a confined volume (or package).

The examples set forth herein include force monitoring systems for monitoring force levels within battery pack modules during compression, assembly and use of the battery pack modules. The force monitoring provides a high level of information that is more accurate and reliable than other traditional types of monitoring. The force levels are monitored and compression forces are adjusted during assembly to satisfy target force levels. The forces are also monitored to detect and/or determine parameters, such as SOC and SOH of the battery pack modules. The forces are also monitored to predict, prevent and/or cease TREs. Forces exerted on battery pack modules change with changes in SOC of the battery pack modules and SOC of cells within the battery pack modules. This may referred to as "cell breathing". SOH is an indicator of aging of a battery pack module. The forces on cells increase with age of the cells. Temperature is an indication of thermal compression and expansion of cells. Forces within battery pack modules also change when there is battery pack module deformation, such as in a collision event. As temperature changes, thickness and thus force on cells change. Thus, SOC, SOH and temperature may be determined based on detected force.

The examples set forth herein include active safety management systems (ASMSs), cell management systems (CMSs), battery management systems (BMSs), and battery cell monitoring systems and circuits for monitoring forces within battery pack modules during formation of the battery pack modules and during intended use of the battery pack modules. During manufacturing, battery pack modules are assembled and run through multiple operations, tests and checks prior to being put in use. During this process and/or during intended use of the battery pack modules, forces exerted on the battery pack modules change. By monitoring the forces, compression forces can be adjusted, target forces can be satisfied, and/or anomalies can be detected and resolved. By monitoring the forces generated during intended use, issues are able to be detected, such as errors in charging, overcharging events, over-discharging events, thermal runaway events, battery aging etc. This is described in further detail below.

The examples disclosed herein are applied to vehicle and non-vehicle implementations. The examples are applicable to internal combustion engine (ICE) vehicles, fully electric vehicles, battery electric vehicles (BEVs), hybrid electric vehicles including plug-in hybrid electric vehicles (PHEVs), partially or fully autonomous vehicles, and other types of vehicles. The examples are also applicable to, for example, electric bikes, network devices, portable electronic devices (e.g., mobile phones, wearable devices, laptop computers, etc.), computers, stationary and mobile power storage devices, and various other devices having battery pack modules.

The following FIGS. 1-7 show example systems, devices and vehicles in which the ASMSs, CMSs, BMSs, and battery pack module monitoring systems and circuits disclosed herein may be applied. The ASMSs, CMSs, BMSs, and battery pack module monitoring systems and circuits may be applied to other systems that utilize battery pack modules.

FIG. 1 shows an example apparatus 10 including force sensors. The apparatus 10 may be a vehicle, a network device, a portable electronic device, a bike, or other apparatus. The apparatus 10 may include a control module 12, a memory 14, one or more loads 16 and a power source 18. The power source 18 may include one or more battery packs 20, force sensors 22 and other sensors 24. As an example, the force sensors 22 may be implemented as thin film sensors that are flexible. The force sensors 22 may be implemented as piezo-resistive force sensors and/or other suitable force sensors.

The control module 12 may supply power from the power source 18 to the loads 16, as shown and/or may control transfer of power directly from the power source 18 to the loads 16. The control module 12 may include an ASM module 26, as further described below. Various examples of battery packs, battery pack modules, battery cells and monitoring circuits are shown and described below and are applicable to this embodiment. The loads 16 may include any electronic device drawing electrical current, such as lights, a display, an electronic and/or electrical circuit, a motor, a compressor, a pump, an actuator, etc.

Figure 2:
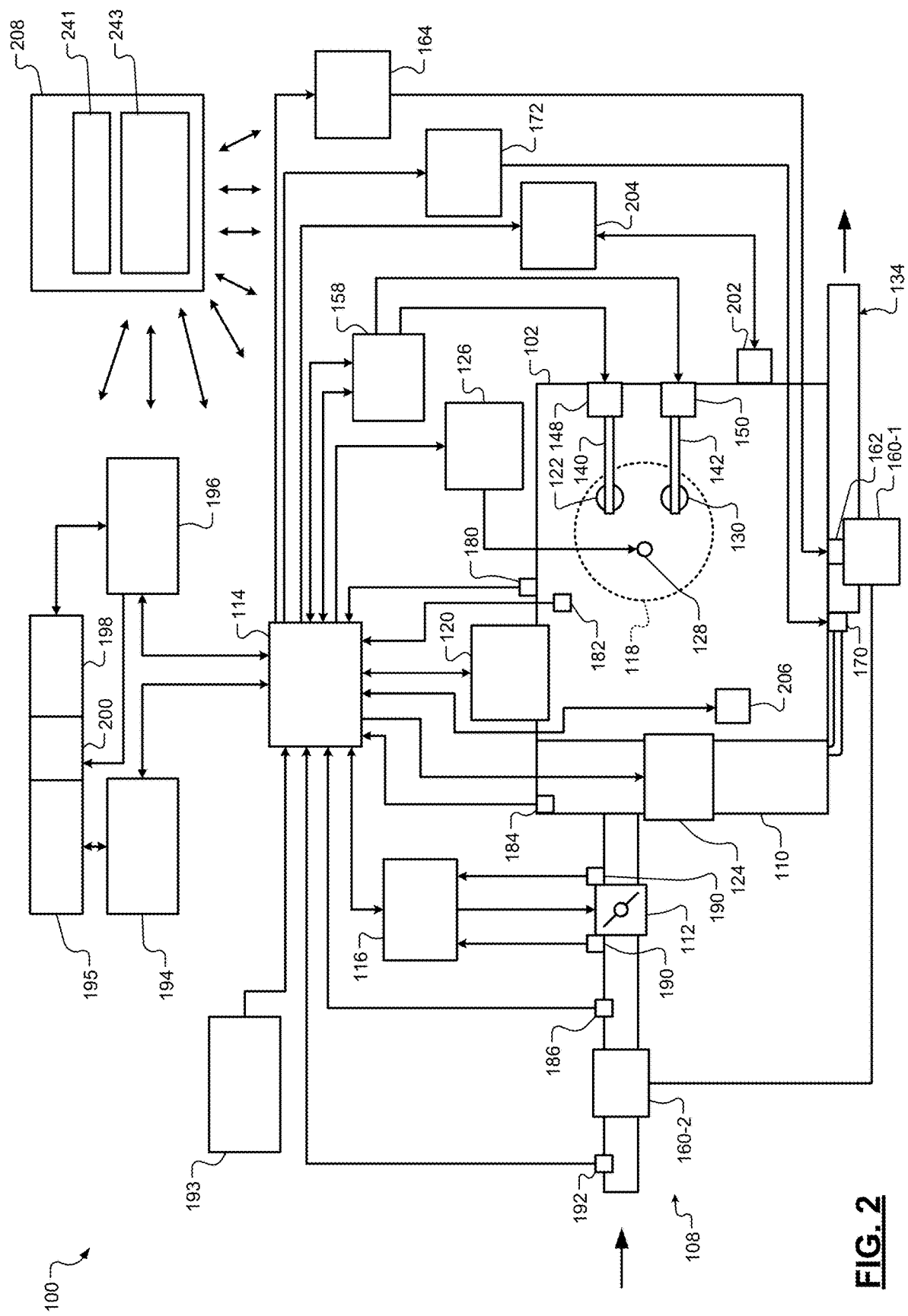
FIG. 2 is a is a functional block diagram of an example vehicle control system including a multiple output dynamically adjustable capacity system (MODACS) including an active safety management system (ASMS) and force sensors in accordance with the present disclosure.

FIG. 2 shows an example powertrain system 100 of a vehicle that includes an engine 102. The vehicle may be non-autonomous, partially autonomous or fully autonomous. The engine 102 includes an intake system 108, an intake manifold 110 and a throttle valve 112. An engine (or vehicle) control module (ECM) 114 controls a throttle actuator module 116. The engine includes one or more cylinders 118, which may be selectively deactivated by the ECM 114 via a cylinder actuator module 120. The cylinder 118 has an intake valve 122. The ECM 114 controls a fuel actuator module 124, which regulates fuel injection to achieve a desired air/fuel ratio. The engine 102 may be a spark-ignition engine, in which case a spark actuator module 126 energizes a spark plug 128 in the cylinder 118 based on a signal from the ECM 114, which ignites the air/fuel mixture. The engine 102 may be a homogenous charge compression ignition (HCCI) engine, which performs both compression ignition and spark ignition, or other type of engine.

The engine 102 may further have an exhaust valve 130 and an exhaust system 134. The intake valve 122 may be controlled by an intake camshaft 140, while the exhaust valve 130 may be controlled by an exhaust camshaft 142. The engine 102 may further include an intake cam phaser 148 and an exhaust cam phaser 150. A phaser actuator module 158 may control the intake cam phaser 148 and the exhaust cam phaser 150.

The engine 102 may include a turbocharger turbine 160-1, a turbocharger compressor 160-2 a waste gate 162, and an exhaust gas recirculation (EGR) valve 170. A waste gate actuator module 164 controls the waste gate 162. The EGR valve 170 may be controlled by an EGR actuator module 172. The engine 102 may further include a crankshaft position sensor 180, an engine coolant temperature (ECT) sensor 182, a manifold absolute pressure (MAP) sensor 184, a mass air flow (MAF) sensor 186, one or more throttle position sensors (TPS) 190, an intake air temperature (IAT) sensor 192 and/or one or more other sensors 193.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules. Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a MODACS 208 to the electric motor 198 to cause the electric motor 198 to output positive torque. The MODACS 208 may include an ASM module 241, force sensors 243 and other sensors as referred to herein.

As an example, the MODACS 208 may have multiple battery modules. The MODACS 208 may be implemented as a single battery having a corresponding housing with a negative (or ground reference) terminal and multiple source terminals. Each of the source terminals of the MODACS 208 may have a preset direct current (DC) voltage (e.g., 12 volts (V), 24V, 36V, 48V, etc.) and may supply (or discharge) current or receive current during charging. As an example, the MODACS 208 may include a single 48V source terminal, a first 12V source terminal and a second 12V source terminal.

The MODACS 208 may operate as a low-voltage high-power system. When a safety fault arises in the MODACS 208, such as a short circuit, or overcharging, a thermal runaway and/or propagation condition may occur. If an abnormal safety fault condition exists with a battery pack module (or block of cells), the block of cells may be shutdown and/or isolated and/or quickly discharged to prevent thermal runaway propagation. When a cell and/or block overheats, temperatures of adjacent cells and/or blocks can increase, which can result in additional faults. Another abnormal safety condition that can require a shutdown is an overheat condition, which results in an abnormal heat signal being generated indicating a block of cells is overheating. Safety techniques include disconnecting a block of cells that is suspicious of having a fault from a power grid of the MODACS 208. The block of cells may then be removed and/or sent to a quality assessment facility to determine (i) whether an issue exists with the block of cells, and (ii) whether the block of cells is serviceable or needs to be replaced. As further described below, the forces detected be force sensors in battery pack modules of the MODACS 208 may be used to predetect, prevent and/or stop TREs.

The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted.

The ECM 114 starts the engine 102 via a starter motor 202. The ECM 114 or another suitable module of the vehicle engages the starter motor 202 with the engine 102 for an engine startup event. The ECM 114 may also start the engine in response to an auto-start command during an auto-stop/start event or to an engine start command for a sailing event. A starter actuator module 204 controls the starter motor actuator and the starter motor 202 based on signals from a starter control module, as discussed further below. In various implementations, the starter motor 202 may be maintained in engagement with the engine 102. The starter motor 202 draws power from the MODACS 208 to start the engine 102.

A generator 206 converts mechanical energy of the engine 102 into alternating current (AC) power. For example, the generator 206 may be coupled to the crankshaft (e.g., via gears or a belt) and convert mechanical energy of the engine 102 into AC power by applying a load to the crankshaft. The generator 206 rectifies the AC power into DC power and stores the DC power in the MODACS 208. Alternatively, a rectifier that is external to the generator 206 may be implemented to convert the AC power into DC power. The generator 206 may be, for example, an alternator. In various implementations, such as in the case of a belt alternator starter (BAS), the starter motor 202 and the generator 206 may be implemented together.

A MODACS control module 240 may be attached to, implemented in or be connected externally to the housing of the MODACS 208. Example MODACS and MODACS control modules are shown in FIGS. 3, 4A, 6 and 11. The MODACS control module 240 may be implemented partially or fully at the housing or at a remote location. As an example, the MODACS control module 240 may be implemented as a control module within a vehicle and/or as part of a vehicle control module.

Figure 8:
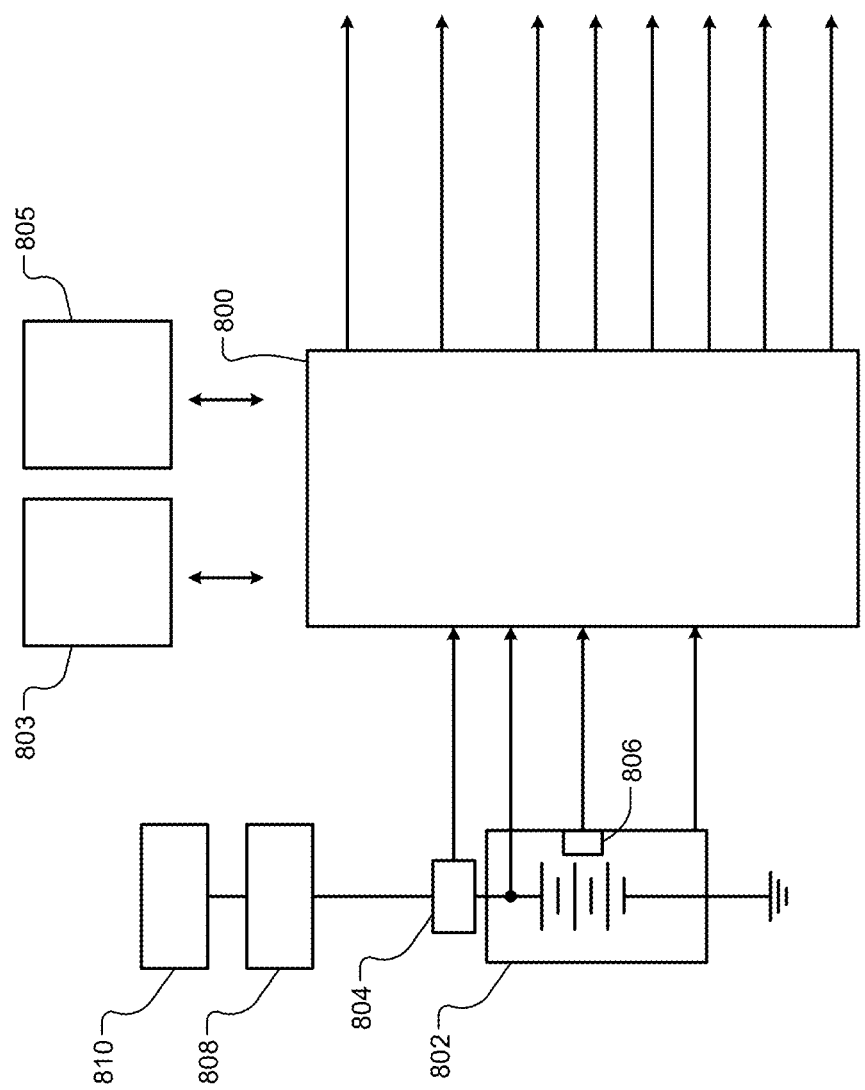
FIG. 8 is a functional block diagram of an example battery monitoring (or management) system (BMS) module for a battery pack or a battery pack module implementing force monitoring in accordance with the present disclosure.
Figure 11:
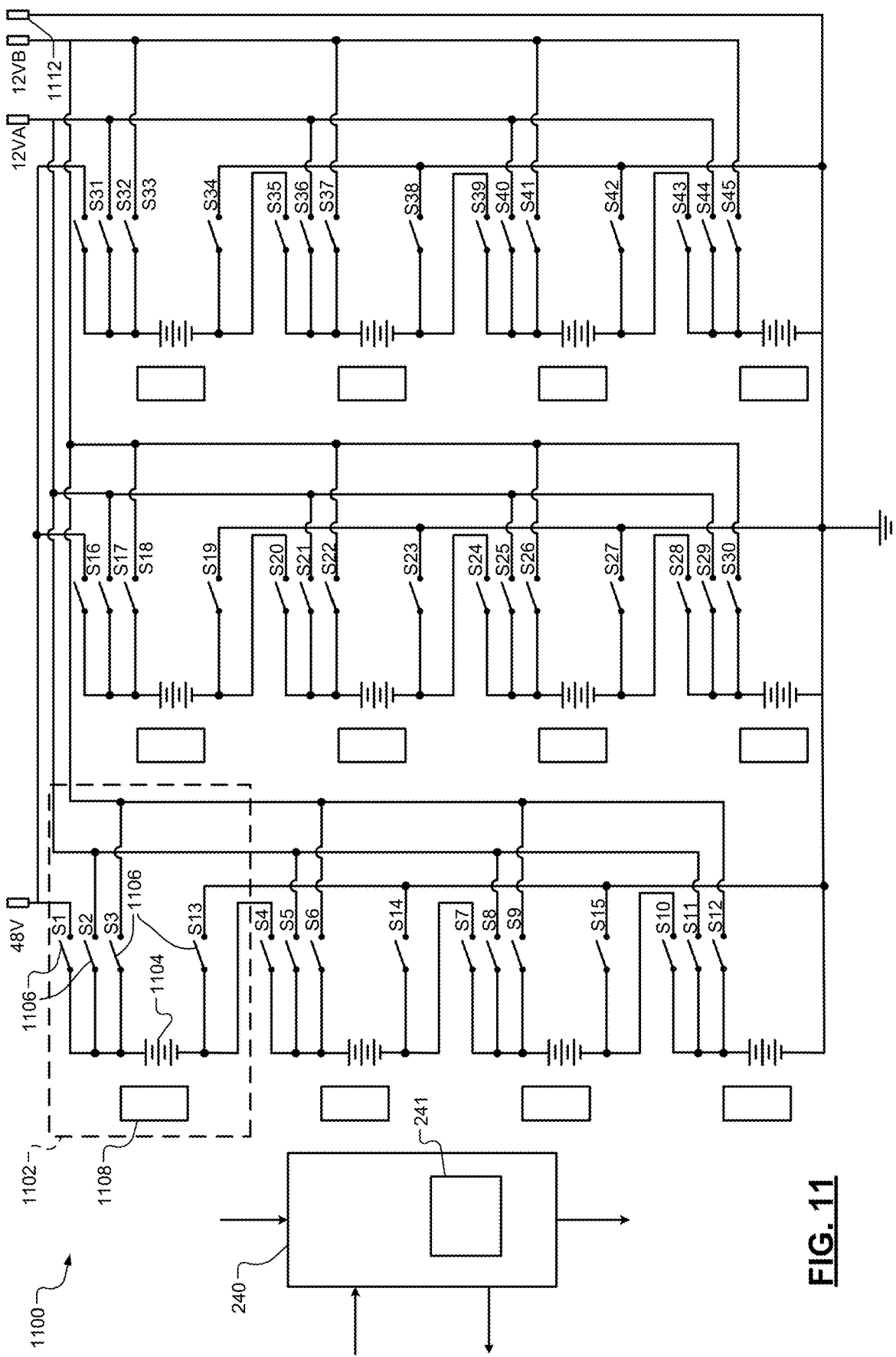
FIG. 11 is a schematic of an example portion of a MODACS circuit in accordance with the present disclosure.

The housing of the MODACS 208 may include monitoring circuits, switches and battery monitoring (or management) system (BMS) modules, examples of which are shown in FIGS. 8 and 11. The switches and BMS modules may be connected to, implemented in, and/or implemented separate from the battery pack modules of the MODACS 208. The BMS modules may include monitoring circuits and/or sensors.

The MODACS control module 240 controls operating states of the switches to connect selected ones of the cells and battery pack modules to the source terminals based on information from the BMS modules. Any number of the cells and/or battery pack modules may be selected and connected to each of the source terminals at any moment in time. The cells and/or battery pack modules may be connected: in series and/or in parallel; in different connected configurations; and may be organized into packs and/or groups. Each battery pack module may include one or more sets of cells, which may be connected in series and/or in parallel. Each group may include one or more packs, which may be connected in series and/or in parallel. The groups may be connected in series and/or in parallel.

Each of the BMS modules may be assigned to one or more cells, one or more battery pack modules, and/or one or more groups and monitor corresponding parameters, such as: force levels in battery pack modules; voltages; temperatures; current levels; SOXs; instantaneous power and/or current limits; short-term power and/or current limits; continuous power and/or current limits; and/or gas levels of gases within the cells. Gas levels within individual cells, battery pack modules, and/or groups may be monitored.

Instantaneous power and current limits may refer to power and current limits for a short period of time (e.g., less than 2 seconds). Short term power and current limits may refer to power and current limits for an intermediate length of time (e.g., 2-3 seconds). Continuous power and current limits refer to power and current limits for an extended period of time (e.g., periods greater than 3 seconds).

A MODACS control module 240 controls the states of the switches to connect the cells and/or battery pack modules to the source terminals while satisfying target and/or requested voltages, currents and power capacities. The MODACS control module 240 and/or a vehicle control module may set the target and/or requested voltages, currents and power capacities, for example, based on a mode of operation. The MODACS 208 may operate in different operating modes, which correspond to vehicle operating modes, as described below. The MODACS operating modes may include, for example, a regenerative mode, a boost mode, an auto start mode, or other MODACS charge or discharge modes. The vehicle operating modes may include an electric vehicle launch mode, an engine start mode, an engine assist mode, an opportunity charging mode, a deceleration fuel cut-off (DFCO) regenerative mode, an electric vehicle regenerative mode (e.g., a generator DFCO regenerative mode or a brake regenerative mode), an electric vehicle cruise mode, and/or other vehicle operating mode. Additional vehicle operating modes are described below. Each of the vehicle operating modes corresponds to one of the MODACS modes. The stated modes are further described below.

Figure 3:
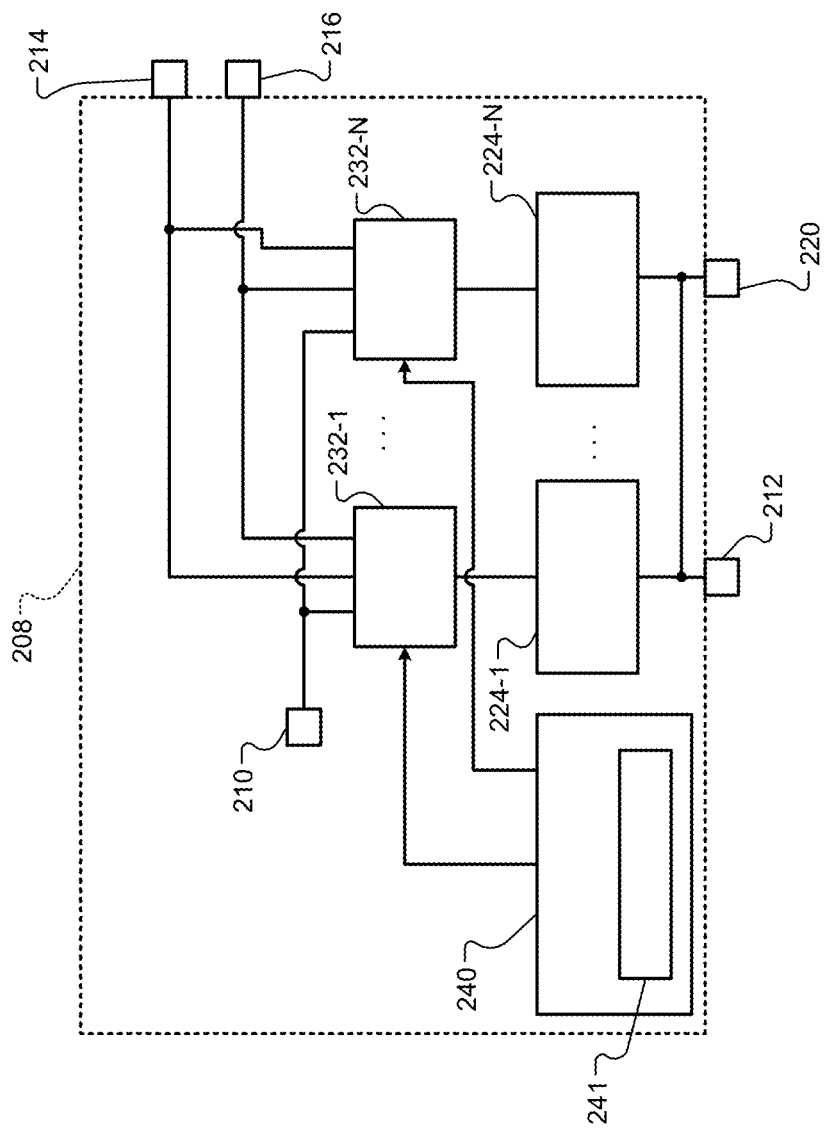
FIG. 3 is a functional block diagram of an example MODACS in accordance with the present disclosure.

FIG. 3 shows a MODACS 208 that may be implemented as a single battery having multiple source terminals. Three example source terminals 210, 214, 216 are shown, although any number of source terminals may be included. The source terminals, which may be referred to as positive output terminals, provide respective direct current (DC) operating voltages. The MODACS 208 may include only one negative terminal or may include a negative terminal for each source terminal. For example only, the MODACS 208 may have a first positive (e.g., 48 Volt (V)) terminal 210, a first negative terminal 212, a second positive (e.g., a first 12V) terminal 214, a third positive (e.g., a second 12V) terminal 216, and a second negative terminal 220. While the example of the MODACS 208 having a 48V operating voltage and two 12V operating voltages is provided, the MODACS 208 may have one or more other operating voltages, such as only two 12V operating voltages, only two 48V operating voltages, two 48V operating voltages and a 12V operating voltage, or a combination of two or more other suitable operating voltages. As another example, the operating voltages may range from 12V-144V.

The MODACS 208 includes cells and/or blocks of cells, such as a first block (or string) 224-1 to an N-th block (or string) 224-N ("blocks 224"), where N is an integer greater than or equal to 2. Each of the blocks 224 may include one or more cells. Each block may also be separately replaceable within the MODACS 208. For example only, each of the blocks 224 may be an individually housed 12V DC battery. The ability to individually replace the blocks 224 may enable the MODACS 208 to include a shorter warranty period and have a lower warranty cost. The blocks 224 are also individually isolatable, for example, in the event of a fault in a block. In various implementations, the MODACS 208 may have the form factor of a standard automotive grade 12V battery.

Each of the blocks 224 has its own separate capacity (e.g., in amp hours, Ah). The MODACS 208 includes switches, such as first switches 232-1 to 232-N (collectively "switches 232"). The switches 232 enable the blocks 224 to be connected in series, parallel, or combinations of series and parallel to provide desired output voltages and capacities at the output terminals. Although examples of some switches are shown, other switches may be included to perform the various operations disclosed herein.

A MODACS control module 240 includes an ASM module 241 and may control the switches 232 to provide desired output voltages and capacities at the source terminals. The MODACS control module 240 controls the switches 232 to vary the capacity provided at the source terminals based on a present operating mode of the vehicle, as discussed further below. The ASM module 241 may also control the stated switches 232 to disconnect, isolate, test and/or reconnect blocks of cells from the power grid, which includes the other blocks of cells, source terminals, negative terminals, etc. Operations of the ASM module 241 are further described below.

Figure 4A:
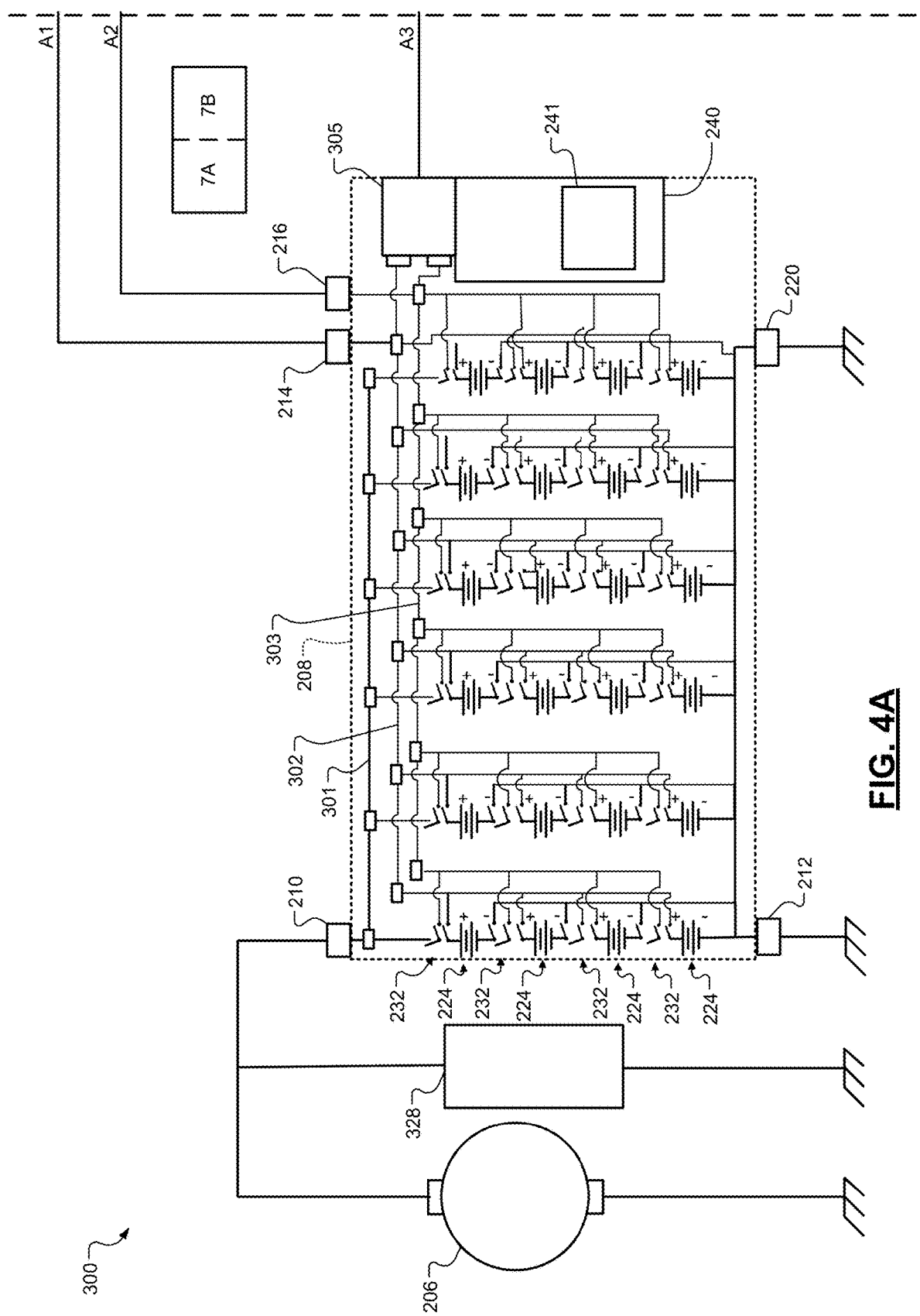
FIGS. 4A-4B are a schematic including an example implementation of a MODACS in accordance with the present disclosure.
Figure 4B:
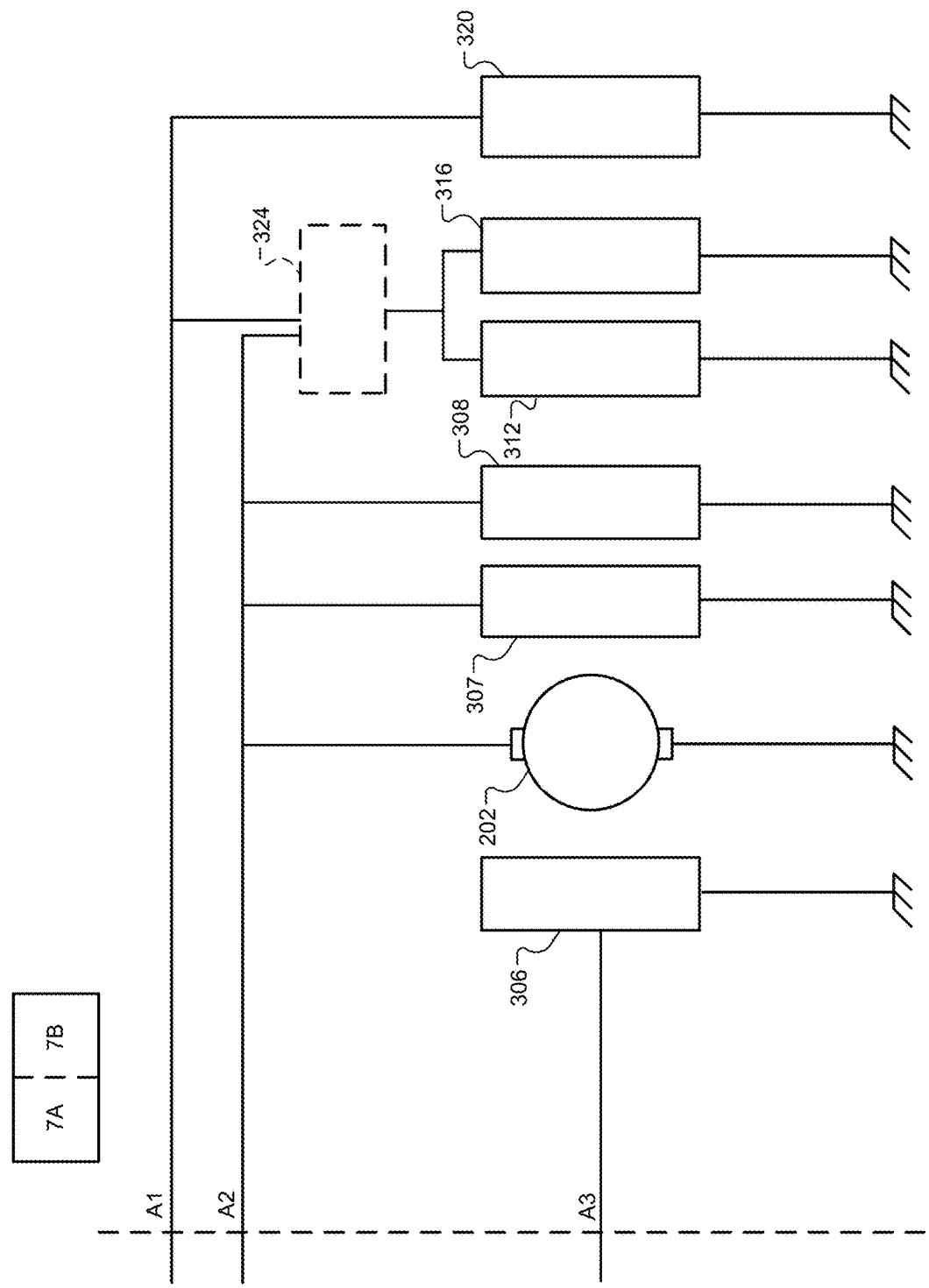

FIGS. 4A-4B show a vehicle electrical system 300 including an example implementation of the MODACS 208. The MODACS 208 includes the source terminals 210, 214, 216, respective power rails 301, 302, 303, a MODACS control module 240, and a power control circuit 305, which may be connected to the MODACS control module 240 and vehicle control module (VCM) and/or body control module (BCM) 306. The VCM and/or BCM 306 may operate similar as, include and/or be implemented as the ECM 114 of FIG. 6. Power rail 303 may be a redundant power rail and/or used for different loads than the power rail 302. The MODACS control module 240 including the ASM module 241, the power control circuit 305, the VCM and/or the BCM 306 may communicate with each other via a controller area network (CAN), a local interconnect network (LIN), a serial network, wirelessly and/or another suitable network and/or interface. The MODACS control module 240 may communicate with the VCM and/or BCM 306 directly or indirectly via the power control circuit 305 as shown.

In the example of FIG. 4A, sets of 4 of the blocks 224 (e.g., 12V blocks) are connectable in series (via ones of the switches 232) to the first positive terminal 210 and the first negative terminal 212 to provide a first output voltage (e.g., 48V). Individual ones of the blocks 224 may be connected (via ones of the switches 232) to the second positive terminal 214 or the third positive terminal 216 and the second negative terminal 220 to provide a second output voltage (e.g., 12V) at the second and third positive terminals 214 and 216. How many of the blocks 224 are connected to the first positive terminal 210, the second positive terminal 214, and the third positive terminal 216 dictates the portions of the overall capacity of the MODACS 208 available at each of the positive terminals. Any number of the blocks may be connected in series and any number of series sets may be connected in parallel. In the example of FIG. 4A, the blocks 224 are shown with battery symbols. Each block may include any number of cells, where each cell is connected in series. Each cell may be a prismatic cell or a pouch cell. As an example, the cells may be lithium ion cells (e.g., a lithium iron battery (LFP) cells).

As shown in FIG. 4B, a first set of vehicle electrical components operates using one of the two or more operating voltages of the MODACS 208. For example, the first set of vehicle electrical components may be connected to the second and third positive terminals 214 and 216. Some of the first set of vehicle electrical components may be connected to the second positive terminal 214, and some of the first set of vehicle electrical components may be connected to the third positive terminal 216. The first set of vehicle electrical components may include, for example but not limited to, the VCM and/or BCM 306 and other control modules of the vehicle, the starter motor 202, and/or other electrical loads, such as first 12V loads 307, second 12V loads 308, other control modules 312, third 12V loads 316, and fourth 12V loads 320. In various implementations, a switching device 324 may be connected to both of the first and second positive terminals 214. The switching device 324 may connect the other control modules 312 and the third 12V loads 316 to the second positive terminal 214 or the third positive terminal 216.

As shown in FIG. 4A, a second set of vehicle electrical components operates using another one of the two or more operating voltages of the MODACS 208. For example, the second set of vehicle electrical components may be connected to the first positive terminal 210. The second set of vehicle electrical components may include, for example but not limited to, the generator 206 and various electrical loads, such as 48V loads 328. The generator 206 may be controlled to recharge the MODACS 208.

Each of the switches 232 may be an insulated gate bipolar transistor (IGBT), a field effect transistor (FET), such as a metal oxide semiconductor FET (MOSFET), or another suitable type of switch.

Figure 5:
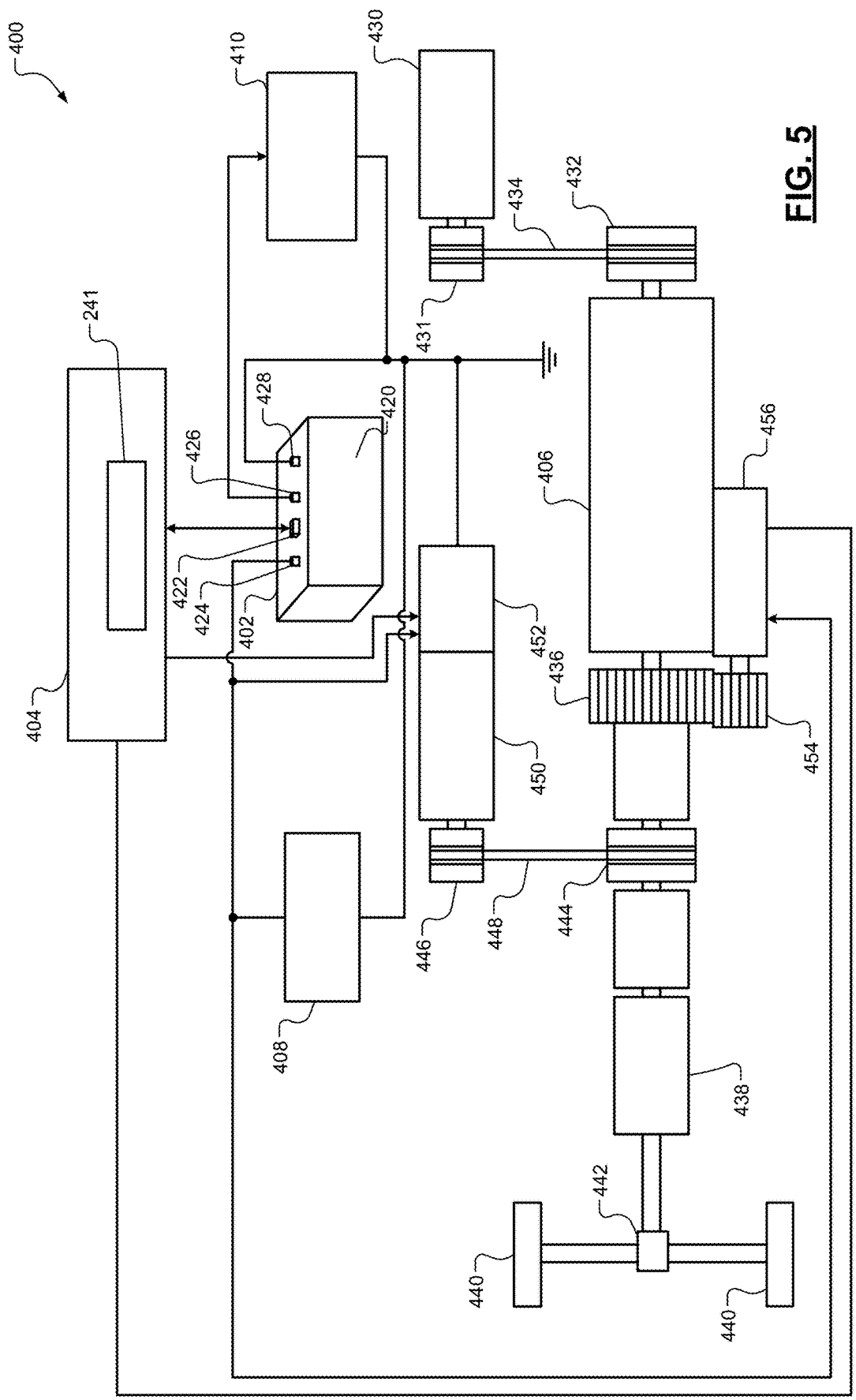
FIG. 5 is a functional block diagram of another example of a vehicle control system including a vehicle control module with an active safety management (ASM) module in accordance with the present disclosure.

FIG. 5 shows an example of another vehicle control system 400 that is applicable to the MODACSs disclosed herein. The vehicle control system 400 includes a MODACS 402, a vehicle control module 404, an internal combustion engine (ICE) 406, high-voltage loads 408, and low-voltage loads 410. The vehicle control module 404 may operate similarly as the other vehicle control modules referred to herein and may include the ASM module 241. The high-voltage loads 408 may include electric motors, compressors, and/or other high-voltage loads. The low-voltage loads may include lights, seat heaters, electric fans, audio system, video system, power window motors, power door lock motors, electronic circuits, etc. The MODACS 402 has a housing 420 and includes a MODACS control module 422, a first source terminal 424, a second source terminal 426 and a negative (or reference ground) terminal 428. The MODACS 402 may have any number of source terminals.

The ICE 406 may drive a water pump 430 via pulleys 431, 432 and belt 434. The ICE 406 may drive a main gear 436, which drives a clutches C1, C2 and a transmission 438 to drive wheels 440 via a differential 442. The first clutch C1 may be used to engage pulleys 444, 446 and belt 448, which drive a motor generator unit (MGU) 450. The second clutch C2 may be used to engage the transmission 438. An AC-to-DC converter 452 converts alternating current (AC) power from the MGU 450 to DC power, which is used to charge the cells of the MODACS 402. The main gear 436 may be turned by a second gear 454 via a starter 456 when cranking the ICE 406.

Figure 6:
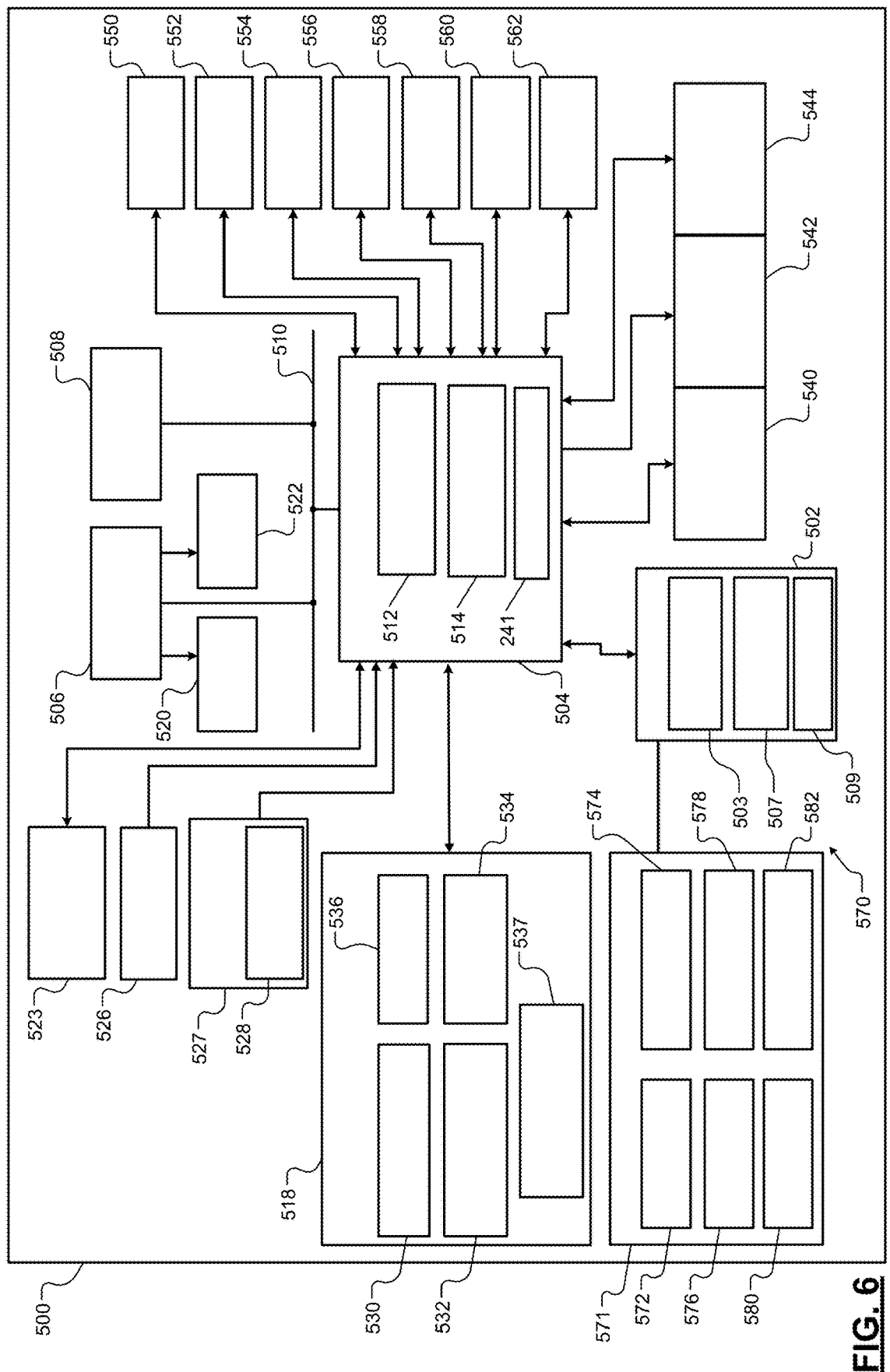
FIG. 6 is a functional block diagram of an example vehicle including MODACS monitoring circuits and force sensors in accordance with the present disclosure.

FIG. 6 shows a vehicle 500 illustrating another example implementation of a MODACS, which may replace and/or operate similarly as the MODACS 208 and 402 of FIGS. 2-5. The vehicle 500 may include a MODACS 502 with a MODACS control module 503, monitoring circuits 507 and force sensors 509. Although the vehicle 500 is shown having a MODACS, the vehicle may alternatively and/or in addition to the MODACS include one or more other power sources, which may also include battery pack modules, monitoring circuits, sensors including force sensors, and control modules as disclosed herein. The vehicle 500 further includes a vehicle control module 504, an infotainment module 506 and other control modules 508. The monitoring circuits 507 may be implemented as part of the MODACs 502 or separate from the MODACS 502. Various example implementations of the monitoring circuits 507 are described herein and are applicable to the embodiments of FIG. 1-6.

The modules 503, 504, 506, 508 may communicate with each other via one or more buses 510, such as a controller area network (CAN) bus and/or other suitable interfaces. The vehicle control module 504 may control operation of vehicles systems. The vehicle control module 504 may include a mode selection module 512, a parameter adjustment module 514, as well as other modules. The mode selection module 512 may select a vehicle operating mode, such as one of the vehicle operating modes stated above. The parameter adjustment module 514 may be used to adjust parameters of the vehicle 500.

The vehicle 500 may further include: a memory 518; a display 520; an audio system 522; one or more transceivers 523 including sensors 526; and a navigation system 527 including a global positioning system (GPS) receiver 528. The sensors 526 may include sensors, cameras, objection detection sensors, temperature sensors, accelerometers, vehicle velocity sensor, and/or other sensors. The GPS receiver 528 may provide vehicle velocity and/or direction (or heading) of the vehicle and/or global clock timing information.

The memory 518 may store sensor data 530 and/or vehicle parameters 532, MODACS parameters 534, and applications 536. The applications 536 may include applications executed by the modules 503, 504, 506, 508. As an example, the memory may store a thermal runaway application 537, which may be implemented to predict, prevent and/or stop TREs. The thermal runaway application 537 may be implemented by, for example, the ASM module 241 or other module referred to herein. Although the memory 518 and the vehicle control module 504 are shown as separate devices, the memory 518 and the vehicle control module 504 may be implemented as a single device.

The vehicle control module 504 may control operation of an engine 540, a converter/generator 542, a transmission 544, a window/door system 550, a lighting system 552, a seating system 554, a mirror system 556, a brake system 558, electric motors 560 and/or a steering system 562 according to parameters set by the modules 503, 504, 506, 508. The vehicle control module 504 may set some of the parameters based on signals received from the sensors 526. The vehicle control module 504 may receive power from the MODACS 502, which may be provided to the engine 540, the converter/generator 542, the transmission 544, the window/door system 550, the lighting system 552, the seating system 554, the mirror system 556, the brake system 558, the electric motors 560 and/or the steering system 562, etc. Some of the vehicle control operations may include unlocking doors of the window/door system 550, enabling fuel and spark of the engine 540, starting the electric motors 560, powering any of the systems 550, 552, 554, 556, 558, 562, and/or performing other operations as are further described herein.

The engine 540, the converter/generator 542, the transmission 544, the window/door system 550, the lighting system 552, the seating system 554, the mirror system 556, the brake system 558, the electric motors 560 and/or the steering system 562 may include actuators controlled by the vehicle control module 504 to, for example, adjust fuel, spark, air flow, steering wheel angle, throttle position, pedal position, door locks, window position, seat angles, etc. This control may be based on the outputs of the sensors 526, the navigation system 527, the GPS receiver 528 and the above-stated data and information stored in the memory 518.

The vehicle control module 504 may determine various parameters including a vehicle speed, an engine speed, an engine torque, a gear state, an accelerometer position, a brake pedal position, an amount of regenerative (charge) power, an amount of boost (discharge) power, an amount of auto start/stop discharge power, and/or other information, such as priority levels of source terminals of the MODACS 502, power, current and voltage demands for each source terminal, etc. The vehicle control module 504 may share this information and the vehicle operating mode with the MODACS control module 503. The MODACS control module 503 may determine other parameters, such as: an amount of charge power at each source terminal; an amount of discharge power at each source terminal; maximum and minimum forces at cells, blocks, packs, and/or groups; maximum and minimum voltages at source terminals; maximum and minimum voltages at power rails, cells, blocks, packs, and/or groups; SOX values cells, blocks, packs, and/or groups; temperatures of cells, blocks, packs, and/or groups; current values of cells, blocks, packs, and/or groups; power values cells, blocks, packs, and/or groups; etc. The MODACS control module 503 may determine connected configurations of the cells and corresponding switch states as described herein based on the parameters determined by the vehicle control module 504 and/or the MODACS control module 503.

The vehicle 500 includes an ASM system 570, which includes the ASM module 241, the MODACS 502, and the MODACS control module 503. Although shown in the vehicle control module 504, the ASM module 241 may be included in the MODACS control module 503. In one embodiment, the vehicle control module 504 and the MODACS control module 503 are implemented as a single control module.

The vehicle 500 may further include a thermal management system (TMS) 571 that is used to maintain the temperature of MODACS 502 and also for discharging suspicious and/or faulty blocks of cells. The ASM module 241 may control connection to and operation of the TMS 571. The TMS 571 may include a cooling fan 572, a cooling pump 574, a cell balancing system 576, a thermal electric generator (e.g., a Peltier cooler) 578, a resistive load 580 and/or other TMS loads 582. The cooling fan 572 and the cooling pump 574 may be used to circulate air and/or a coolant through the MODACS 502. Discharging suspicious and/or faulty cells by powering the cooling fan 572 and/or the cooling pump 574 serves multiple purposes. The powering of the cooling fan 572 and/or the cooling pump 574 cools cells of the MODACS 502 including the suspicious and/or faulty cells while the charge of the suspicious and/or faulty cells is reduced or suspended. This removes a potential hazard associated with the suspicious and/or faulty cells. The fan may also be reversed if the airflow provides cooler air in this direction. Any of the TMS loads 572, 574, 576, 578, 580, 582 may be connected to discharge the suspicious and/or faulty cells. The connection of the TMS loads may also reduce risk of a thermal chain reaction with cells adjacent the suspicious and/or faulty cells.

The following examples of FIGS. 7-15 are applicable to all of the above-described examples of FIGS. 1-6.

Figure 7:
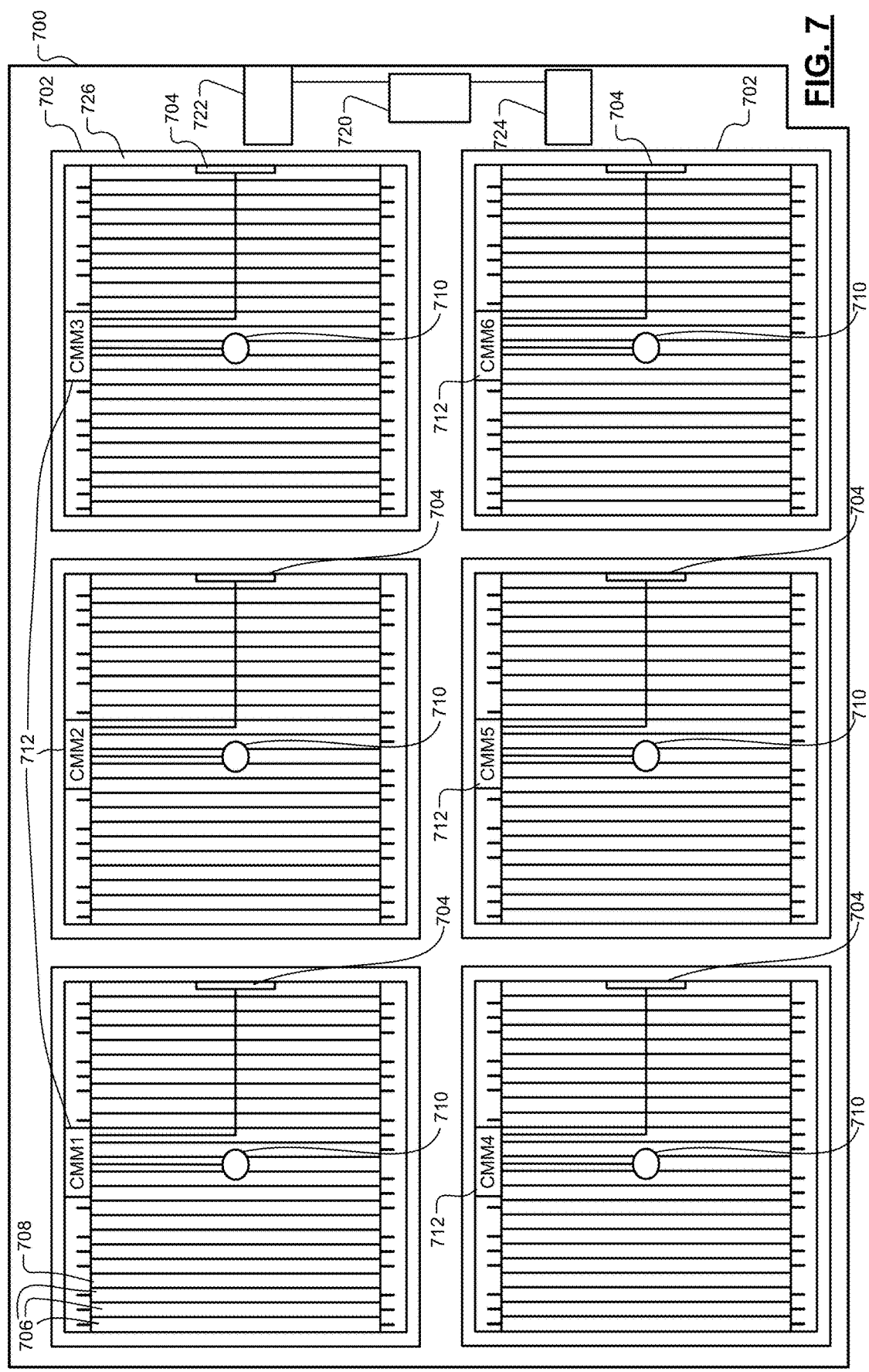
FIG. 7 is a functional block diagram of an example battery pack including battery modules with force sensors in accordance with the present disclosure.

FIG. 7 shows an example battery pack 700 including battery pack modules (some of which are designated 702) with force sensors 704. Each of the battery pack modules includes sets of cells (some cells are designated 706) separated by mitigation material layers (one of the mitigation material layers is designated 708). The mitigation material layers provide separation and allow for compression and expansion of the cells. The mitigation material layers may provide thermal separation and aid in preventing TREs. The mitigation material layers may be implemented as foam insulative layers.

The force sensors 704 are integrated in the battery pack modules and detect forces within the battery pack modules. Each of the battery pack modules may include one or more force sensors. In one embodiment, each of the battery pack modules includes only a single force sensor. The changes in force detected by a single force sensor may be caused by changes in, for example, pressure anywhere in the corresponding battery pack module. Unlike other types of sensors, which may detect parameters specific to a particular location within a battery pack module, a force sensor may be used to detect changes in force that may occur anywhere in the battery pack module. The force sensors may be thin film type force sensors used to measure forces during assembly and intended operation, which includes being used to detect TREs and/or other abnormalities and/or parameters of the battery pack modules. The force sensors may be implemented as piezoresistive force sensors. The force sensors may be simple, low cost, robust, small, and low power force sensors. As an example, the force sensors may each detect 0-10,000 Newtons of force.

The battery pack modules may each include one or more other sensors, such as temperature sensors 710. The battery pack modules may further include cell management modules (CMMs) 712, which may monitor outputs of the force sensors 704, temperature sensors 710, and other sensors. The CMMs 712 may include voltage sensors, current sensors and/or other sensors for monitoring voltages, current levels and/or other parameters of the cells.

The battery pack 700 may also include a BMS module 720 and other sensors, such as a gas sensor 722 and a pressure sensor 724, which may be located within the battery pack 700, but not in the battery pack modules. The sensors 722, 724 are used to detect gas levels and pressures within the battery pack 700. Gas sensors and/or pressure sensors may be implemented in the cells and/or in the battery pack module.

The force sensors 704 may be connected to the CMMs 712 as shown and/or to the BMS module 720. The CMMs 712 may be wire connected or wirelessly connected to the BMS module 720. The CMMs 712 share parameters detected and/or determined with the BMS module 720. Each of the force sensors 704 may be disposed as part of a respective mitigation material layer and/or between the respective mitigation material layer and an outer case of the corresponding battery pack module. One of the outer cases is designated 726. Although the force sensors 704 are shown in certain locations in the battery pack modules, the force sensors 704 may be located in other locations within the battery pack modules.

The ASM systems referred to herein actively monitor cells and instantaneously and/or quickly disconnect, isolate, and/or reevaluate conditions of the cells. A safety fault may be detected and due to an internal short, an overcharging of cells, and/or other safety fault conditions. When a battery pack module safety fault (or suspicious) signal (e.g., an abnormal change and/or rate of change in force signal, an over temperature signal, an abnormal rate of change in voltage signal, an abnormal increase an gas pressure, an abnormal rate of change in temperature signal, and/or other irregularity signal) is generated and diagnosed, the ASM system adjusts: a working mode of the suspicious block of cells and/or working modes of one or more other blocks of cells; adjusts cooling of the block of cells; and/or isolates the block of cells. The actions may include disconnecting and/or isolating the suspicious block of cells. In one embodiment, a block of cells may be isolated when a cell of the block of cells is experiencing an issue.

Force levels as well as other parameters, such as gas levels within battery cells during formation of the battery cells and during intended use of the battery cells may be monitored. During manufacturing, assembly and/or intended use of the battery cells, gases (e.g., carbon monoxide (CO), carbon dioxide ($CO_2$), hydrogen ($H_2$), ethylene ($C_2H_4$), and/or methane ($CH_4$)) may be generated within the battery cells. Forces within the battery pack modules changes with changes in formation of gases. By monitoring the force and gas levels generated during formation, optimal formation time can be determined, or anomalous cells can be identified. By monitoring the force and gas levels generated during intended use, issues are able to be detected, such as errors in charging, overcharging events, over-discharging events, thermal runaway events, battery aging etc. This is described in further detail below.

FIG. 8 is a functional block diagram of an example BMS module 800 for a power source 802 (e.g., battery pack or a battery pack module) implementing force monitoring. In one embodiment, the battery monitoring system module 800 is provided for each block of cells as part of an ASM system. In the example shown, the BMS module 800 monitors forces, voltages, temperatures, gas levels, power levels, and current levels of the corresponding power source 802 and determines certain parameters. The BMS module 800 may include, be connected to, and/or communicate with one or more monitoring circuits (one monitoring circuit 803 is shown) for monitoring parameters of the power source 802. The monitoring circuits may be configured similarly and/or perform similar operations as other monitoring circuits (e.g., CMMs) disclosed herein. In one embodiment, the BMS module is in communication with multiple CMMs, which are located in respective battery pack modules. In another embodiment, the BMS module 800 is connected to one or more gas sensors (one gas sensor 805 is shown). The gas sensors may be connected to or included in one or more cells.

The parameters may include instantaneous charge and discharge power and current limits, short term charge and discharge power and current limits, gas level limits and/or thresholds, and continuous charge and discharge power and current limits. The parameters may also include minimum and maximum force levels, minimum and maximum voltages, minimum and maximum operating temperatures, and SOX limits and/or values. The parameters output by the BMS module 800 may be determined based on the force levels, voltages, temperatures and/or current levels monitored. The charge and discharge power and current capability of battery pack module is affected by the minimum and maximum force levels, minimum and maximum voltages, minimum and maximum operating temperatures, and SOX limits and/or values of the corresponding cells. The BMS module 800 may monitor individual cell voltages, temperatures gas levels, and current levels and determine based on this information the stated parameters. The parameters output by the BMS module 800 are shown as arrow out of the BMS module 800. The parameters received by the BMS module 800 are shown as arrow directed to the BMS module 800. The BMS module 800 may generate safety fault signals when certain safety fault conditions are detected, such as the safety fault conditions referred to herein.

As an example, the BMS module 800 may include and/or be connected to sensors, such as a current sensor 804, the gas sensor 805 and a temperature sensor 806, which may be used to detect current levels through the cells of the power source 802, gas levels of gases in cells, and temperatures of the power source 802. As an example, a voltage across the pack may be detected as shown. In an embodiment, one or more voltage sensors may be included to detect voltages of the power source 802. The current sensor 804 may be connected, for example, between the power source 802 and a source terminal 808, which may be connected to a load 810. The temperatures, gas levels, voltages, and current levels are reported to the BMS module 800 and/or the ASM module 241 (shown in FIGS. 3-6 and 24) as some of the parameters received by the BMS module 800.

The detected forces and generated force signals may be used to confirm and/or provide redundancy with respect to an issue, such as a TRE, detected based on outputs of the other sensors. This confirmation and/or redundancy prevents generation of false alerts and/or performing countermeasures based on false alerts. The detected forces allows the BMS module and/or other monitoring module referred to herein to quickly detect an issue, such as a TRE, and/or detect changes of state associated with an upcoming TRE if mitigation operations are not performed to prevent the TRE from occurring. Thus, early TRE warnings are able to be generated.

By monitoring forces of different battery pack modules, an ASM and/or BMS is able to detect thermal runaway propagation from battery pack module to battery pack module. The forces may be monitored to detect cell damage due to an impact or collision. The BMS may monitor the forces to provide an accurate indication of cell compression during battery pack module assembly, which may be relayed to, for example, a compression control module. The compression control module may then adjust cell compression prior to, during and/or after cycling of battery pack module. Cycling may refer to the charging and discharging of the battery pack module. An example of a compression control module is shown in FIGS. 13-14.

The BMS module may monitor average SOH of cells and/or battery pack modules based on the detected forces of the battery pack modules. The average SOH may be used as an indication of aging and/or how much remaining life is left for the cells and/or battery pack modules. The average SOC and/or average temperature of the cells and/or battery pack modules may also be determined. The average SOH, average SOC and average temperature may be indirectly estimated based on the detected forces.

Figure 9:
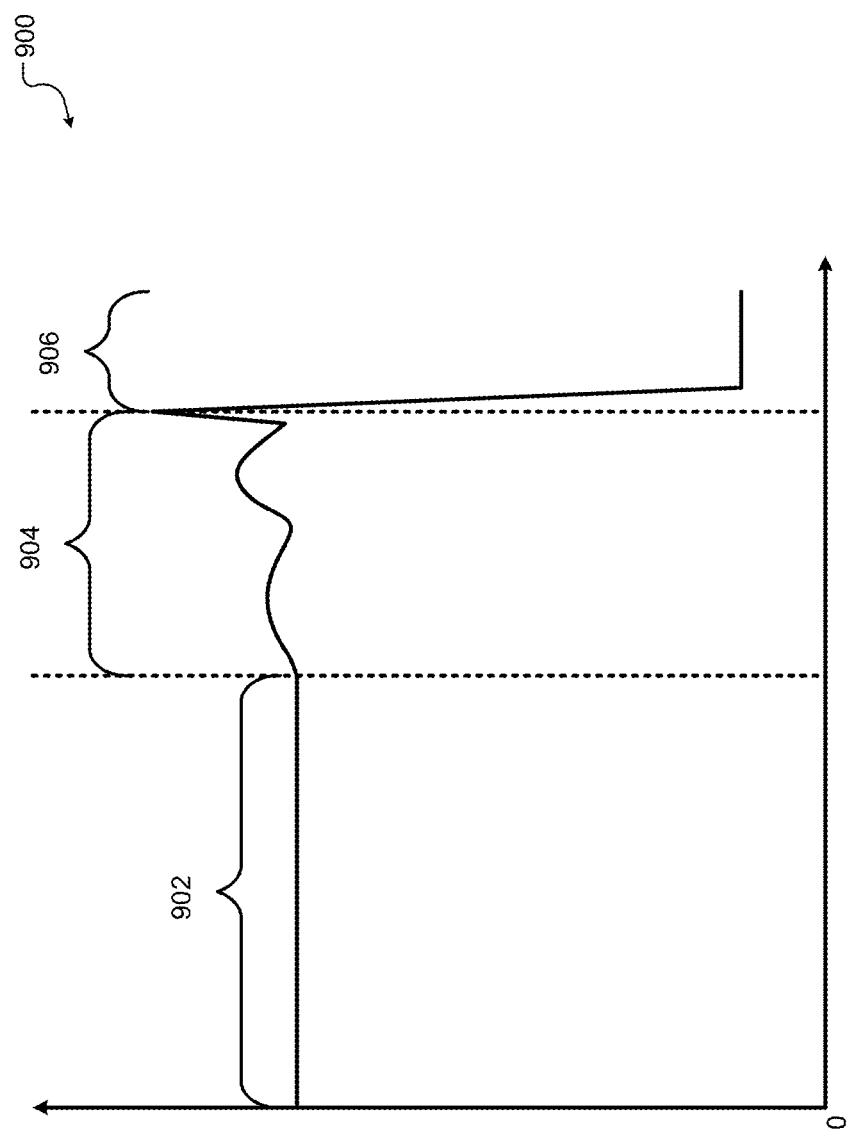
FIG. 9 is an example plot of battery pack module force versus time.

FIG. 9 shows a plot 900 of battery pack module force versus time. The plot 900 has three stages 902, 904, 906. The plot is an example of a signal from one of the force sensors 704 of FIG. 7, which may occur prior to and during a TRE event of the corresponding battery pack module. The three stages 902, 904, 906 refer to a normal operation stage, an intermediate TRE predictive stage, and a TRE onset stage, respectively.

At the normal operation stage 902, the battery pack module is operating normally and there no abnormality in operation. At stage 902, the force level may remain constant and/or have a low level of change and rate of change in force. The force may be at a baseline force exhibited during assembly/compression of the battery pack module or a new baseline due to, for example, use and aging of the battery pack module.

At the intermediate TRE predictive stage 904, there is an abnormal fluctuation in force, where there is a medium level change in force and/or a medium level rate of change in force. This abnormality can be used as an early predictive detection of an upcoming TRE that may occur should no mitigation operation be implemented to prevent the TRE. The slope of the force curve is steeper in the intermediate TRE predictive stage 904 than in the normal operation stage 902. Alert messages may be generated to raise caution of a potential TRE.

At the TRE onset stage 906, there is a large change in force and/or a large rate of change in force indicative of an onset of a TRE. This may be an indication that a TRE has begun. The slope of the force curve is steeper in the TRE onset stage 906 than in the intermediate TRE predictive stage 904. An alert message may be generated indicating the occurrence of a TRE and TRE propagation may be monitored.

Figure 10:
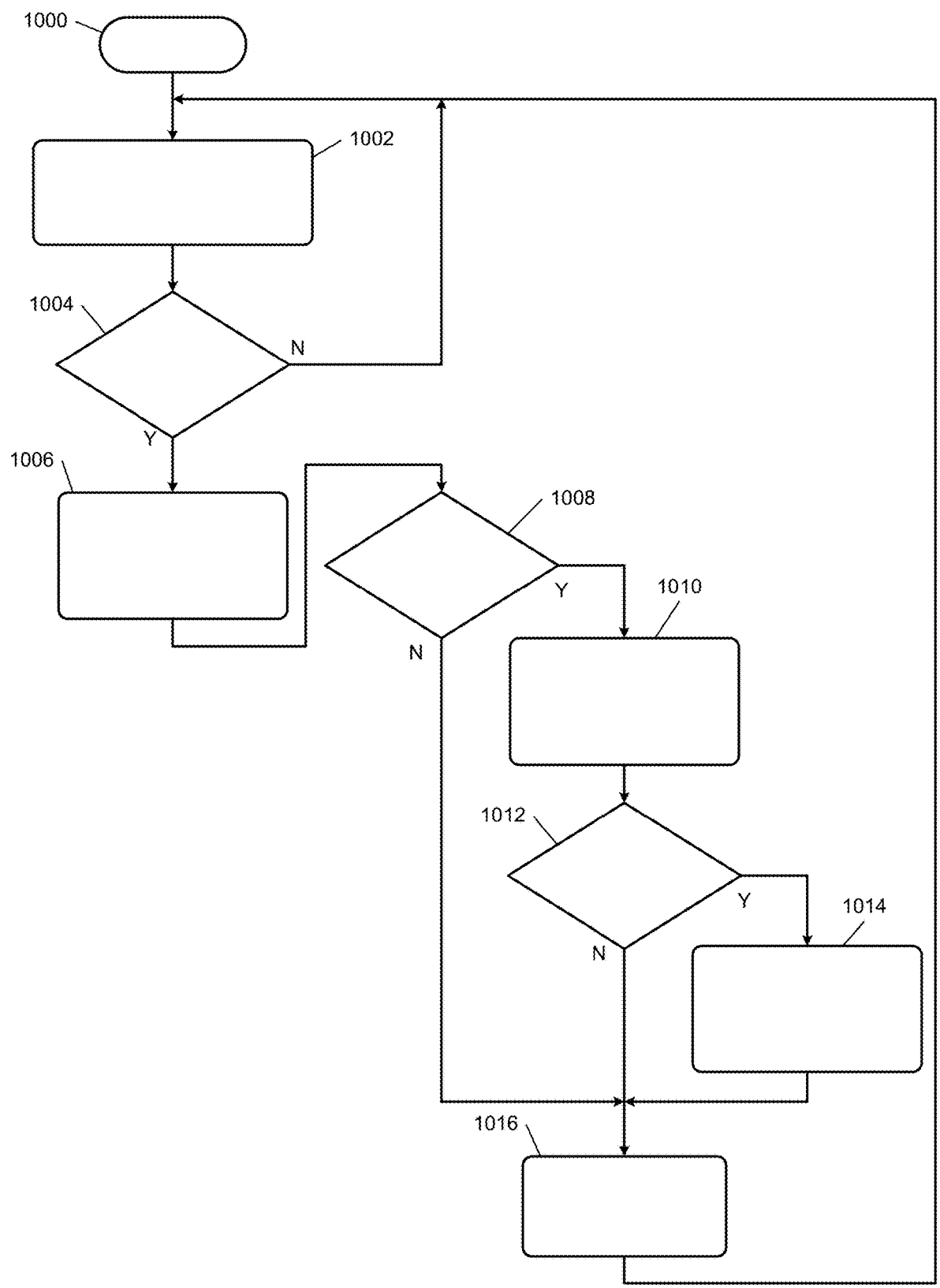
FIG. 10 illustrates a battery pack module force based mitigation method in accordance with the present disclosure.

FIG. 10 shows a battery pack module force based mitigation method that may be implemented by a monitoring and/or control module such as, for example, any of the ASM modules, CMMs, and/or a BMS modules referred to herein. The operations may be iteratively performed and may begin at 1000. At 1002, battery pack module parameters are monitored including force over time.

At 1004, the monitoring and/or control module may determine whether the measured force F is greater than or equal to a first threshold THR1 and/or a change in force dF/dt is greater than or equal to a second threshold THR2. If yes, operation 1006 may be performed, otherwise operation 1008 is performed.

At 1006, the monitoring and/or control module performs and/or initiates a first mitigation strategy, which includes performing operations to prevent a TRE event. These operations may be performed, for example, while in the intermediate TRE predictive stage of FIG. 9. The first mitigation strategy may include: targeted module cooling; fast and targeted discharge of cells and battery pack module; electrical isolation of battery pack module; alerting users, passengers, owners, managers, etc. of the abnormality; and/or performing other mitigation operations.

Figure 12:
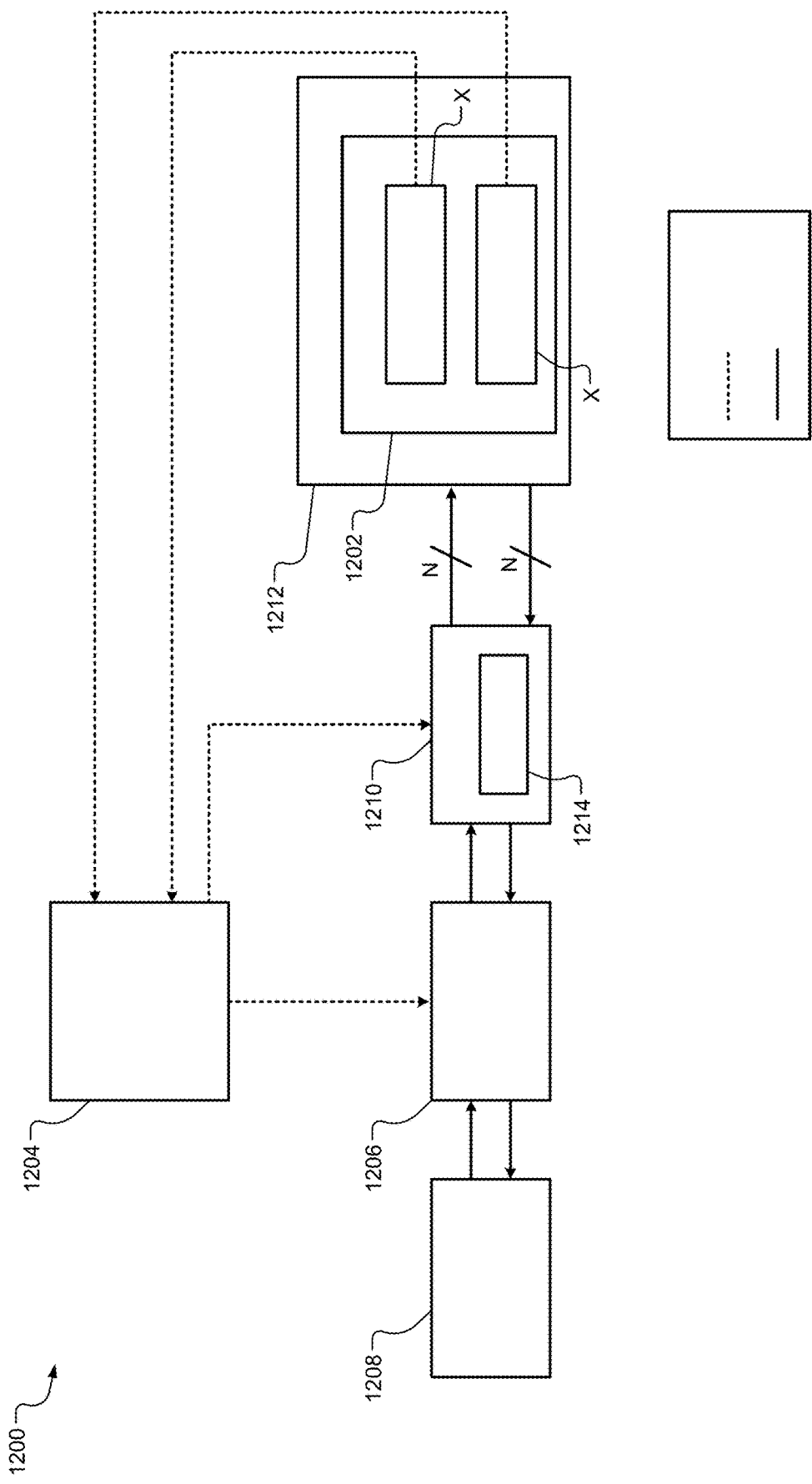
FIG. 12 is a functional block diagram of a cooling system for battery pack modules in accordance with the present disclosure.

The targeted module cooling may include cooling a portion of a battery pack (e.g., cooling the battery pack module(s) of concern and not other battery pack modules, cooling the battery pack of concern and not other battery packs, etc.). An example cooling system is shown in FIG. 12 that may be used to provide the targeted cooling. TMS loads such as the loads shown in FIG. 6 may be used to provide the targeted cooling.

The actions may include disconnecting and/or isolating the suspicious block of cells while continuing to operate normally or in a derated state and connecting at least the suspicious block of cells to TMS loads as described above and performing a discharging process according to the programmed discharging protocols. The programmed discharging protocols may include operation in a constant voltage mode, a constant current mode, or a mixed mode to discharge the block of cells until a state of charge of the block of cells is less than a predetermined threshold (e.g., less than 5% of a full charge). This is accomplished in a short period of time to remove any safety hazard potential to the MODACS and/or vehicle system. While discharging the block of cells, the ASM adjusts operation of other blocks of cells that are in a "good" operating condition to continue operation according to power grid priorities. This may include distributing voltage, current, and/or power capacity of the good blocks of cells between redundant rails to satisfy power demands. To discharge a block of cells, a discharge process is performed including quickly connecting the block of cells to TMS loads to quickly discharge the block of cells. The block of cells may be discharged to a predetermined SOC level and then isolated.

The above-stated alerting may be implemented via the infotainment module 506 of FIG. 6. This may include providing messages via the display 520 and/or audible alerts via the audio system 522.

At 1008, the monitoring and/or control module may determine whether the measured force is greater than or equal to a third threshold THR3 and/or the change in force dF/dt is greater than or equal to a fourth threshold THR4. If yes, operation 1010 may be performed, otherwise operation 1016 is performed. The threshold THR3 is greater than the threshold THR1. The threshold THR4 is greater than the threshold THR2.

During operations 1004 and 1008, the absolute values of the force and change in force dF/dt may be compared to the stated thresholds THR1-THR4. Operation 1006 may be performed when the absolute value of F is greater than or equal to THR1 and/or the absolute value of dF/dt is greater than THR2. Similarly, operation 1010 may be performed when the absolute value of F is greater than or equal to THR3 and/or the absolute value of dF/dt is greater than THR4.

At 1010, the monitoring and/or control module may evaluate other parameters, such as gas levels, voltages, pressures, temperatures and/or other parameters of cells, battery pack modules and/or corresponding battery pack. At 1012, the monitoring and/or control module may determine whether other parameters indicate a TRE is occurring. If yes, operation 1014 may be performed, otherwise operation 1016 may be performed. As an example, a TRE may occur due to a pouch cell rupture, which causes the release of energy. There can be a quick increase in cell pressure (or force) due to gas build up and then a sudden drop off in pressure (or force).

Baselines of parameters of the battery pack module may be continuously monitored to detect a TRE. The parameters may include force levels, SOH, SOC, temperature, voltages, current levels, and/or other parameters referred to herein with regards to states of the battery pack module and cells within the battery pack module. The monitoring and/or control module may track changing baselines of these parameters over time. This may include machine learning based on current and historical data to track the changing baselines. A TRE may be detected based on baseline values of these parameters. The baseline parameters are dependent on age, battery pack module configuration, number of cells, arrangement of the cells, materials and chemistry of the cells, sizes of the cells, etc. As an example, the thickness of cells tends to increase with age and thus force within the corresponding battery pack module increases with age. As a result, the baseline force for normal operation increases with age.

At 1014, the monitoring and/or control module may perform a second mitigation strategy and/or operations to cease thermal runaway. The second mitigation strategy may include: signaling a fire station; alerting passengers, users, owners, etc. to evacuate the vehicle having the battery pack; performing targeted cooling; discharging battery pack modules adjacent to the battery pack module experiencing the TRE; flooding the battery pack with coolant; and/or other mitigation operations. The flooding of the battery pack may be implemented via, for example, the cooling system of FIG. 12.

At 1016, the monitoring and/or control module may schedule service of the battery pack and/or cease use of the battery pack such that the battery pack is able to be serviced. This may include scheduling service for the vehicle of the battery pack in order to have the battery pack replaced and/or serviced. Operation 1002 may be performed subsequent to operation 1016 or the method may end.

FIG. 11 shows a portion of a MODACS circuit 1100 that includes one or more source terminals. The MODACS circuit 1100 may include multi-functional solid-state switches, switch drive circuits, current and voltage sense circuits arranged in a minimum switch count topology to enable on-demand capacity allocation for source terminals having similar or dissimilar preset (or target) voltages. The MODACS circuit 1100 is flexible, modular, and has minimum size, complexity, weight, and component count. For at least these reasons, the MODACS circuit 1100 minimizes manufacturing difficulty.

As shown, the MODACS circuit 1100 includes block sets, where each block set includes: a battery pack and/or one or more battery pack modules; switches; a BMS module and source terminals with corresponding power rails. The BMS modules may be configured as the BMS module 800 of FIG. 8. The BMS modules may be in communication with and/or connected to force sensors and other sensors, as described herein. An example block set 1102 is outlined and includes a power source 1104, 4 switches 1106 and a BMS module 1108. The power sources are shown with battery symbols and may each include one or more battery pack modules. Three of the switches 1106 connect the power source 1104 to source terminals (e.g., a 48V, 12VA, and a 12VB source terminals are shown). The fourth one of the 4 switches 1106 connects the power source 1104 to a ground reference (or negative terminal) 1112. In an embodiment, the force sensors monitor force levels of the battery pack modules and signal the BMS modules the force levels detected. The switches are controlled to achieve a desired capacity at each source terminal based on control module demands and status updates in the form of feedback signals from the BMS modules of the blocks.

As shown, the block sets may be arranged in an array having rows and columns. Each of the block sets may be configured the same except one of the rows closest to the ground reference. In this row, each of the blocks includes three switches instead of four switches. As a result, the corresponding cells are connected to the ground reference without use of switches, as shown.

As can be seen, the block sets may be connected to each of the source terminals. Any block set may be connected to any one or more of the source terminals. The first switches in the block sets in one of the rows (or first row) may be connected to the first source terminal (48V source terminal). The first switches in the block sets in one or more intermediate rows (e.g., the second and third rows) may be connected to cell(s) in a previous row. This allows the cell(s) in the block sets in each column to be connected in series. Under certain conditions, the battery pack modules in columns are connected in series to form two or more series of battery pack modules and the multiple series of battery pack modules are connected in parallel to maximize power to the first source terminal.

The MODACS circuit 1100 further includes a MODACS control module 240 that controls states of the battery pack modules and includes the ASM module 241. The MODACS control module 240 receives BMS signals from the BMS modules and a system capacity request signal from a vehicle control module or non-vehicular control module (a control module of a device other than a vehicle). Based on priorities of the voltage source terminals, parameters, and power and current demands indicated by the system capacity request signal, the MODACS control module 240 determines a connected configuration and sets states of the switches. Additional switches than shown may be included for more selective isolation of cells and/or battery pack modules. The parameters may include force levels, voltages, power levels, current levels, gas levels, and temperatures indicated in the BMS signals. The MODACS control module 240 generates an actual capacity allocation signal indicating capacity allocation for the source terminals. The actual capacity allocation may not match the requested capacity allocation depending on: the state of the MODACS including whether there is any faults or shorts; and the SOH of the battery pack modules. The actual capacity allocation signal may be transmitted from the MODACS control module 240 to the vehicle control module or non-vehicular control module.

In an embodiment, the cells of the power sources are lithium battery cells, but may be other types of cells. The example of FIG. 11 is shown to illustrate a minimalistic architecture having a minimal number of blocks and switches per block set to provide 48V, 12VA and 12VB outputs without a DC-to-DC converter.

FIG. 12 shows a cooling system 1200 for battery pack modules 1202 that includes a control module 1204, a pump 1206, a reservoir 1208, a valve assembly 1210 and battery packs 1212. The control module 1204 controls state of the pump 1206 and states of valves 1214 in the valve assembly 1210 to control flow of coolant between i) the reservoir, and ii) the battery packs 1212 and the battery pack modules 1202. The control module 1204 may control flow of coolant to and from each of the battery pack modules 1202 and/or the battery packs 1212 to provide targeted cooling to one or more of the battery pack modules 1202 and/or to provide targeted cooling to one or more of the battery packs 1212. This may be done to prevent and/or stop a TRE. In one embodiment, a single battery pack is included. The battery pack may be implemented as a MODACS, such as one of the MODACS referred to herein. In another embodiment, multiple battery packs are included. The control module 1204 may in certain situations flood one or more of the battery packs 1212 with coolant to stop a TRE.

FIG. 13 shows a compression system 1300 including a battery pack module 1302 being compressed by a load press using shims 1304. The load press is represented by a top shaft 1306 and a stationary base 1308 and includes a load cell 1309. A compression control module 1310 may control operation of a motor (not shown) that moves the shaft 1306 to compress the battery pack module 1302.

The battery pack module 1302 may include an outer cover (or housing) 1320, cells (some of which designated 1322), mitigation material layers (one of which designated 1324), and end plates 1326A, 1326B. The battery pack module 1302 also includes one or more force sensors 1330.

The compression control module 1310 monitors forces detected by the load cell 1309 and the force sensors 1330 to compress the battery pack module 1302. A stack of cells of the battery pack module 1302 are over compressed until targeted force levels are achieved and/or the measured forces are within tolerance ranges of the targeted force levels. The battery pack module 1302 is over compressed to allow for the shims 1304 to be placed between the top end plate 1326A and the cover 1320. The end plates 1326A, 1326B may latch in place onto the cover 1320. When the targeted force levels are achieved and the shims are in place, the load press may release. The force levels measured by the force sensors 1330 are maintained by the shims 1304, end plates 1326A, 1326B, and the cover 1320, which restrict expansion of the cells.

FIG. 14 shows a compression system 1400 including a battery pack module 1402 being compressed by a load press for setting fasteners (e.g., nuts) 1404 on compression rods 1406. The load press is represented by a top shaft 1408, a top plate 1409 connected to the top shaft 1408, and a stationary base 1410. The load press includes a load cell 1412. A compression control module 1414 may control operation of a motor (not shown) that moves the shaft 1408 to compress the battery pack module 1402.

The compression control module 1414 applies pressure on end plates 1416A, 1416B to compress the stack of cells of the battery pack module. Once target force levels, as measured by the load cell 1412 and one or more force sensors 1420, are reached, the fasteners 1404 are tightened on the compression rods 1406. The fasteners 1404 are tightened to maintain the target forces and/or to maintain force levels within tolerance ranges of the target forces. The force levels are measured by the force sensors 1420 of the battery pack module 1402. The compression rods 1406 may be threaded rods and may be connected to terminals of cells of the battery pack module 1402, such that the rods 1406 are respectively at positive and negative potentials. The fasteners 1404 may be implemented as positive and negative terminals of the battery pack module 1402.

Figure 15:
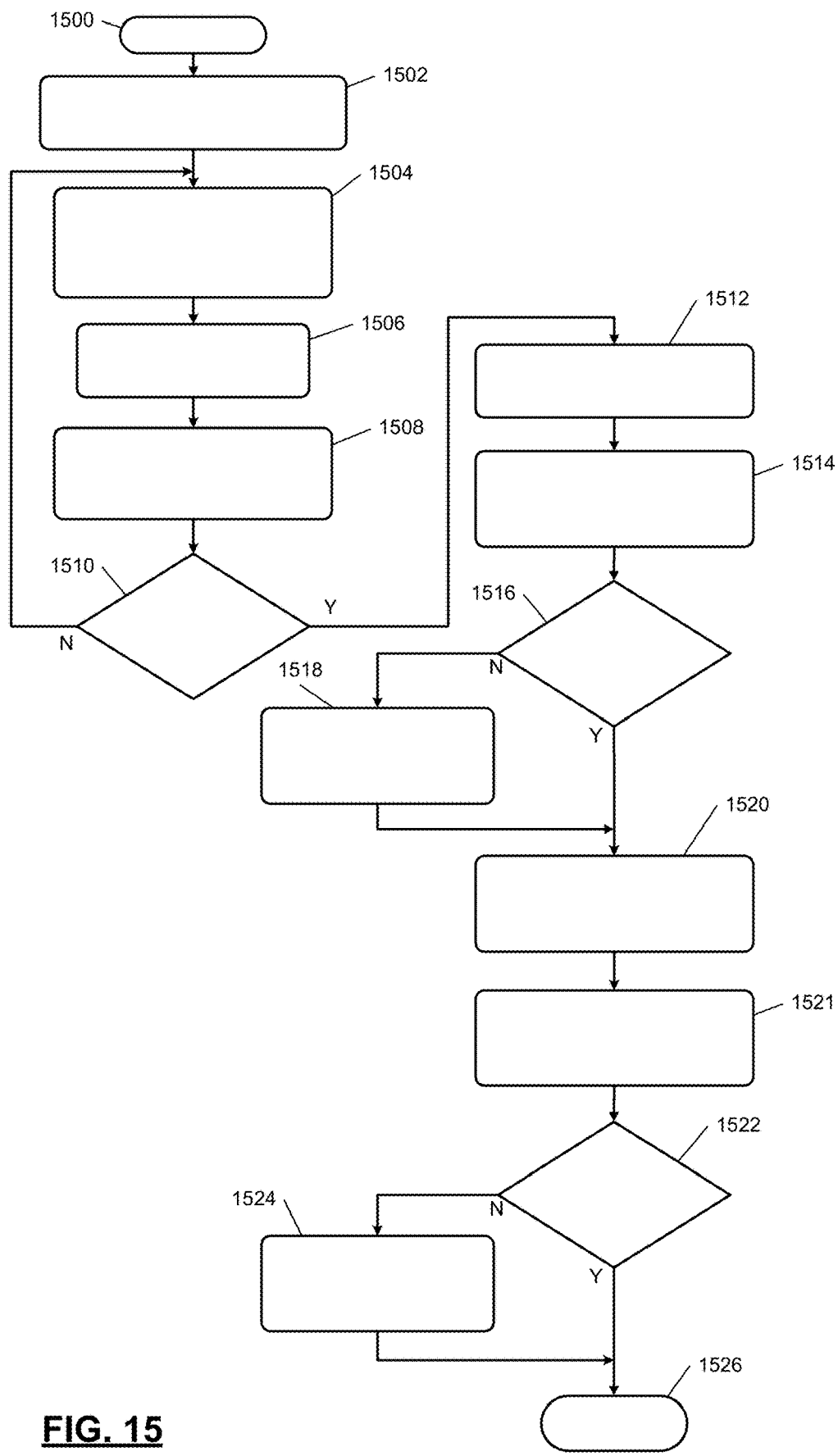
FIG. 15 is a battery module compression method in accordance with the present disclosure.

FIG. 15 shows a battery module compression method that may be implemented using one of the load presses of FIGS. 13-14. The operations of FIG. 15 may be implemented by one of the compression control modules 1310, 1414 of FIGS. 13-14 and/or by another control module. Although the following operations are described with respect to a single control module, the operations may be performed by multiple control modules. For example, operations 1502, 1504, 1506, 1508, 1510 may be performed by a first control module and operations 1514, 1516, 1518, 1520, 1521, 1522, 1524 may be performed by the first control module or a second control module. The operations of FIG. 15 may be performed during, for example, manufacturing and/or assembly of a battery pack in which the battery pack module is to be included.

The method may begin at 1500. At 1502, the control module may detect placement of the battery pack module in a load press. At 1504, the control module may compress the battery pack module to provide targeted force levels on and/or within the battery pack module. The battery pack module may be compressed using an assembly tool, such as the load press and/or other assembly tool. Operations 1506 and 1508 may be performed while performing operation 1504.

At 1506, the control module monitors the force level measured by load cell of the load press. At 1508, the control module monitors force levels measured by force sensors embedded in the battery pack module. The control module may be connected via wire(s) to the force sensors or may receive signals from the force sensors wirelessly.

At 1510, the control module compares the measured force levels provided at 1506, 1508 to initial target force levels. When the measured force levels match and/or are within tolerance ranges of the initial target force levels, operation 1512 may be performed.

At 1512, the battery pack module may be removed from the load press. The force sensors of the battery pack module may be monitored during and after assembly of the battery pack including during conditioning stages of the battery pack module. This allows for verification that the forces remain within tolerance ranges of target force levels.

At 1514, the control module monitors the force levels as measured by the force sensors of the battery pack module. Operation 1514 may be performed while performing operation 1512.

At 1516, the control module determines whether the force levels are within the corresponding tolerance ranges of the corresponding target force levels, which may be the same as the initial target force levels referred to at 1510. If yes, the method may end at 1520, otherwise operation 1518 may be performed.

At 1518, the control module may perform a corrective procedure to adjust cell compression of the battery pack module and thus the forces measured by the force sensors of the battery pack module. This may include placing the battery pack module back into the load press to adjust the forces to be within the tolerance ranges. In another embodiment, the battery pack module is not placed back into the load press, but rather a fastener adjustment method is performed where the battery pack module is located to adjust the forces to be within the tolerance ranges.

At 1520, the control module may perform conditioning stage operations on the battery pack module. This may include, for example, cycling the battery pack module.

At 1521, the control module monitors the force levels as measured by the force sensors of the battery pack module. Operation 1521 may be performed while performing operation 1520.

At 1522, the control module determines whether the force levels are within the corresponding tolerance ranges of the corresponding target force levels, which may be the same as the initial target force levels referred to at 1510. If yes, the method may end at 1526, otherwise operation 1524 may be performed.

At 1524, the control module may perform a corrective procedure to adjust cell compression of the battery pack module and thus the forces measured by the force sensors of the battery pack module. The method may end subsequent to performing operation 1514. The adjustment may be performed similarly as described for operation 1518.

The above-described examples allow for the onset of a TRE to be detected at a battery pack module level based on force levels and other parameters. Module-to-module and cell-to-cell thermal runaway progression is able to be monitored and tracked based on detected force levels and countermeasure mitigation operations may be performed as described above. The disclosed force sensors may be used throughout the formation and lifetime of battery pack modules. The force sensors may be used to improve battery safety.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
   a battery pack module configured to be implemented in a battery pack, the battery pack module comprising
   a plurality of cells, and
   one or more force sensors configured to generate at least one force signal indicative of force on the plurality of cells within the battery pack module; and a control module configured to
receive the at least one force signal,
based on the at least one force signal, detect a state of the plurality of cells,
based on the detected state of the plurality of cells, at least one of i) modify the state of the plurality of cells, ii) perform targeted cooling of the battery pack module, iii) perform electrical isolation of the battery pack module, and iv) flood the battery pack module with coolant,
perform a first operation to determine at least one of i) whether measured force indicated by the at least one force signal is greater than a first threshold, and ii) whether a change in the measured force is greater than a second threshold,
based on a result of the first operation, perform a first mitigation strategy and operations to prevent a thermal runaway event,
subsequent to performing the first mitigation strategy and operations, perform a second operation to determine at least one of i) whether the measured force is greater than a third threshold, and ii) whether the change in the measured force is greater than a fourth threshold, wherein the third threshold is greater than the first threshold, and wherein the fourth threshold is greater than the second threshold, and
based on a result of the second operation, evaluate other parameters to detect a thermal runaway event.

2. The system of claim 1, wherein the control module is configured based on the at least one force signal to verify compression force on the battery pack module during assembly, and based on results of verifying the compression force, to readjust compression of the battery pack module.

3. The system of claim 1, wherein the control module is configured to based on the at least one force signal, detect an abnormality in the plurality of cells, and perform a mitigation operation to address the abnormality.

4. The system of claim 1, wherein the battery pack module comprises only a single force sensor.

5. The system of claim 1, wherein the battery pack module comprises a plurality of force sensors generating a plurality of force signals including the at least one force signal.

6. The system of claim 1, wherein the control module is configured to:
based on the at least one force signal, predict a thermal runaway event; and
perform a mitigation operation to at least one of prevent, slow down and stop the thermal runaway event.

7. The system of claim 1, wherein the control module is configured to at least one predict and detect a thermal runaway event based on a change in magnitude of the at least one force signal.

8. The system of claim 1, further comprising at least one sensor configured to generate at least one sensor signal,
wherein the control module is configured to, based on the at least one sensor signal, detect or verify that an abnormality exists in the plurality of cells.

9. The system of claim 8, wherein the control module is configured to:
based on precalibration, the at least one force signal and the at least one sensor signal, determine at least one of an average state-of-health of the battery pack module, an average state-of-charge of the battery pack module and an average cell temperature of the battery pack module, and
based on the determined the at least one of the average state-of-health of the battery pack module, the average state-of-charge of the battery pack module and the average cell temperature of the battery pack module, at least one of modify the state of the plurality of cells, generate an alert message, and perform a mitigation operation to address the detected abnormality of the plurality of cells,
wherein the at least one sensor comprises at least one of a voltage sensor, a current sensor, a temperature sensor, and gas sensor.

10. The system of claim 1, wherein:
the battery pack module comprises at least one other sensor which operates in concert with the one or more force sensors; and
the control module is configured to confirm an abnormality based on at least one output of the at least one other sensor and the at least one force signal,
wherein the at least one other sensor comprises at least one of a voltage sensor, a current sensor, a gas sensor and a temperature sensor.

11. The system of claim 1, wherein the control module is configured to:
determine one or more parameters of the battery pack module selected from a state-of-charge, a state-of-health, a voltage, a current level, a pressure, a gas level, and a temperature; and
based on the at least one force signal and the one or more parameters, detect an abnormality in the plurality of cells.

12. The system of claim 1, further comprising the battery pack, wherein:
the battery pack comprises a plurality of battery pack modules;
the plurality of battery pack modules include the battery pack module in which an abnormality is detected;
each of the plurality of battery pack modules includes a respective set of cells;
each one of the plurality of battery pack modules comprises a respective one or more force sensors configured to generate at least one force signal indicative of force on the plurality of cells within the one of the plurality of battery pack modules; and
the control module is configured to detect thermal runaway propagation from battery pack module-to-battery pack module based on the force signals received from the plurality of battery pack modules.

13. The system of claim 1, wherein the control module is configured to detect damage to the battery pack module based on the at least one force signal, and at least one of generate an alert message and perform a mitigation operation based on the detected damage.

14. The system of claim 1, wherein the control module is configured: based on the at least one force signal, to verify compression force on the battery pack module; and based on results of verifying the compression force, to readjust compression of the battery pack module.

15. The system of claim 1, wherein the control module is configured to:
based on the other parameters, detect a thermal runaway event; and
in response to detecting the thermal runaway event, perform a second mitigation strategy and operations to cease the thermal runaway event.

16. The system of claim 1, wherein the control module is configured to, based on the detected state of the plurality of cells, modify the state of the plurality of cells.

17. The system of claim 1, wherein the control module is configured to, based on the detected state of the plurality of cells, perform electrical isolation of the battery pack module.

18. A method of detecting an abnormality in a battery pack module of a battery pack, the method comprising:
generating at least one force signal via one or more force sensors, the at least one force signal indicative of force on a plurality of cells within the battery pack module;
receiving the at least one force signal;
based on the at least one force signal, detecting a state of the plurality of cells;
based on the detected state of the plurality of cells, at least one of i) modifying the state of the plurality of cells, ii) generating a message, and iii) performing a mitigation operation to address a detected abnormality of the plurality of cells;
perform a first operation to determine at least one of i) whether measured force indicated by the at least one force signal is greater than a first threshold, and ii) whether a change in the measured force is greater than a second threshold;
based on a result of the first operation, perform a first mitigation strategy and operations to prevent a thermal runaway event;
subsequent to performing the first mitigation strategy and operations, perform a second operation to determine at least one of i) whether the measured force is greater than a third threshold, and ii) whether the change in the measured force is greater than a fourth threshold, wherein the third threshold is greater than the first threshold, and wherein the fourth threshold is greater than the second threshold; and
based on a result of the second operation, evaluate other parameters to detect a thermal runaway event.

* * * * *